(12) United States Patent (10) Patent No.: US 8,488,532 B2
Yamada et al. (45) Date of Patent: Jul. 16, 2013

(54) BASE STATION DEVICE, MOBILE STATION DEVICE, MOBILE STATION IDENTIFIER ALLOCATION METHOD, PROGRAM, AND RECORDING MEDIUM

(75) Inventors: Shohei Yamada, Chiba (JP); Daiichiro Nakashima, Chiba (JP); Keiichi Hibi, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 1176 days.

(21) Appl. No.: 12/161,789

(22) PCT Filed: Jan. 19, 2007

(86) PCT No.: PCT/JP2007/050756
§ 371 (c)(1),
(2), (4) Date: Jul. 22, 2008

(87) PCT Pub. No.: WO2007/083728
PCT Pub. Date: Jul. 26, 2007

(65) Prior Publication Data
US 2010/0220668 A1 Sep. 2, 2010

(30) Foreign Application Priority Data

Jan. 23, 2006 (JP) .................................. 2006-013445
Apr. 19, 2006 (JP) .................................. 2006-115276
Jun. 16, 2006 (JP) .................................. 2006-167657

(51) Int. Cl.
*H04W 4/00* (2009.01)
*H04J 1/00* (2006.01)
*H04J 3/00* (2006.01)

(52) U.S. Cl.
USPC ........... 370/329; 370/330; 370/341; 370/343; 370/345

(58) Field of Classification Search
USPC .......................... 370/329, 330, 341, 343, 345
See application file for complete search history.

(56) References Cited

U.S. PATENT DOCUMENTS 6,466,559 B1 * 10/2002 Johansson et al. ............. 370/335
6,895,248 B1 * 5/2005 Akyol et al. ................. 455/452.1
(Continued)

FOREIGN PATENT DOCUMENTS

JP 2001-237803 A 8/2001
JP 2001-319284 A 11/2001
(Continued)

OTHER PUBLICATIONS

3rd Generation Partnership Project, et al., "Pilot Channel Structure in Evolved UTRA Downlink". R1-050705 pp. 1-15, 2005.
(Continued)

*Primary Examiner* — Farah Faroul
(74) *Attorney, Agent, or Firm* — Birch, Stewart, Kolasch & Birch, LLP

(57) ABSTRACT

To effectively control information on allocation of a radio resource for each mobile station, improve the frequency use efficiency of the entire communication system, and effectively execute base station/mobile station control, a mobile station holds a Chunk Table (TB) in advance and successively receives the SCSCH (Shared Control Signaling Channel) of each predetermined available Chunk from the head of a radio frame. If the SCSCH has a mobile station identifier of the mobile station assigned, the mobile station receives an SDCH (Shared Data Channel) of the corresponding RB (Resource Block) and acquires a CID (Chunk ID). Here, user data may be simultaneously contained in the SDCH. The mobile station registers the acquired CID in the Chunk Table. Moreover, the base station side also has the Chunk Table corresponding to each mobile station and manages whether a CID has been allocated for each mobile station.

19 Claims, 25 Drawing Sheets

U.S. PATENT DOCUMENTS

| | | | |
|---|---|---|---|
| 7,012,912 B2* | 3/2006 | Naguib et al. | 370/343 |
| 7,586,990 B2* | 9/2009 | Subramanian et al. | 375/260 |
| 8,107,418 B2* | 1/2012 | Oh | 370/328 |
| 2001/0028637 A1 | 10/2001 | Abeta et al. | |
| 2002/0167928 A1 | 11/2002 | Terry et al. | |
| 2003/0142694 A1 | 7/2003 | Takano | |
| 2003/0189918 A1 | 10/2003 | Das et al. | |
| 2004/0087325 A1* | 5/2004 | Cheng et al. | 455/515 |
| 2004/0156386 A1 | 8/2004 | Atarashi et al. | |
| 2004/0180675 A1 | 9/2004 | Choi et al. | |
| 2004/0190482 A1* | 9/2004 | Baum et al. | 370/347 |
| 2006/0030342 A1* | 2/2006 | Hwang et al. | 455/466 |
| 2006/0034244 A1* | 2/2006 | Huang et al. | 370/344 |
| 2006/0159061 A1* | 7/2006 | Takano et al. | 370/352 |
| 2006/0195576 A1* | 8/2006 | Rinne et al. | 709/226 |
| 2007/0049278 A1* | 3/2007 | Lindoff et al. | 455/439 |
| 2007/0087694 A1* | 4/2007 | Jin et al. | 455/63.1 |
| 2007/0230405 A1* | 10/2007 | Yin et al. | 370/335 |
| 2008/0311923 A1* | 12/2008 | Petrovic et al. | 455/450 |
| 2009/0110087 A1* | 4/2009 | Liu et al. | 375/260 |
| 2009/0185577 A1* | 7/2009 | Kishiyama et al. | 370/465 |
| 2009/0190539 A1* | 7/2009 | Tanno et al. | 370/329 |
| 2009/0232243 A1* | 9/2009 | Tsuboi et al. | 375/267 |
| 2009/0303939 A1* | 12/2009 | Umesh et al. | 370/329 |
| 2010/0022250 A1* | 1/2010 | Petrovic et al. | 455/450 |
| 2012/0002580 A1* | 1/2012 | Nakashima et al. | 370/311 |
| 2012/0008591 A1* | 1/2012 | Miki et al. | 370/330 |
| 2012/0026969 A1* | 2/2012 | Fukuoka et al. | 370/329 |

FOREIGN PATENT DOCUMENTS

| | | |
|---|---|---|
| JP | 2003-318781 A | 11/2003 |
| JP | 2004-187279 A | 7/2004 |
| JP | 2004-530379 A | 9/2004 |
| JP | 2004-297756 A | 10/2004 |
| JP | 2004-297822 A | 10/2004 |
| WO | WO 2004/102837 A1 | 11/2004 |

OTHER PUBLICATIONS

3rd Generation Partnership Project et al. "Physical Channels and Multiplexing in Evolved UTRA Downlink". R1-050707 pp. 1-15, 2005.

3rd Generation Partnership Project et al. "CQI-based Transmission Power Control for Control Channel in Evolved UTRA". R1-050852. pp. 1-6, 2005.

3rd Generation Partnership Project et al. Technical Specification Group Radio Access Network; Multiplexing and channel coding (FDD)(Release 7). TS25.212 V7.2.0 (Sep. 2006) pp. 1-84, Sep. 2006.

3rd Generation Partnership Project. et al. Technical Specification Group Radio Access Network; Physical channels and mapping of transport channels onto physical channels (FDD) (Release 6). TS25.211 V6.4.0 (Mar. 2005) pp. 1-59.

Tachikawa, Keiji et al. "W-CDMA Mobile Communication Systems", ISBN4-621-04894-5, pp. 103-106 and 115-117. (Jun. 2001).

3rd Generation Partnership Project et al. Technical Specification Group Radio Access Network; High Speed Downlink Packet Access: Physical Layer Aspects (Release 5). TR 25.858 V5.0.0 (Mar. 2002) pp. 1-31.

3rd Generation Partnership Project et al. "Pilot Channel Structure in Evolved UTRA Downlink". R1-050705 pp. 1-15. (Aug. 29-Sep. 2, 2005).

3rd Generation Partnership Project et al. "Physical Channels and Multiplexing in Evolved UTRA Downlink". R1-050707 pp. 1-15. (Aug. 29-Sep. 2, 2005).

3rd Generation Partnership Project et al. "CQI-based Transmission Power Control for Control Channel in Evolved UTRA". R1-050852. pp. 1-6. (Aug. 29-Sep. 2, 2005).

3rd Generation Partnership Project et al. Technical Specification Group Radio Access Network; Multiplexing and channel coding (FDD)(Release 7). TS25.212 V7.2.0 (Sep. 2006) pp. 1-84.

QUALCOMM Europe, "Impact of Synchronous HARQ in DL", 3GPP TSG-RAN WG1 LTE Ad Hoc, Jan. 23-25, 2006, R1-060176, pp. 1-6 (available Jan. 19, 2006).

Samsung, "Security threats and architecture", 3GPP TSG-RAN3 Meeting #50, Jan. 9-13, 2006, R3-060018, pp. 1-11 (appears R3-06xxxx on document) (available Jan. 5, 2006).

Sharp, "Control Channel Mapping for MIMO Antennas in Evolved UTRA OFDMA Downlink", 3GPP TSG-RAN WG1 LTE Ad Hoc Meeting, Jan. 23-25, 2006, R1-060005, pp. 1-4 (available Jan. 19, 2006).

Sharp, "Short UE Identity for Downlink Scheduling Information", 3GPP TSG-RAN WG1 #46, Aug. 28-Sep. 1, 2006, R1-062257, pp. 1-7 (available Aug. 23, 2006).

Sharp, "Shorter UE ID for Downlink Scheduling Information", 3GPP TSG-RAN WG1 #47, Nov. 6-10, 2006, R1-063211, pp. 1-6 (available Nov. 1, 2006).

Supplemental Partial European Search Report dated Jan. 3, 2012 for Application No. 07713643.0.

Texas Instruments, "Multiplexing of EU Identifies in the Shared Control Channel of EUTRA Downlink", 3GPP TSG RAN WG1 Ad Hoc on LTE, Jan. 23-25, 2006, R1-060064, pp. 1-5 (available Jan. 19, 2006).

\* cited by examiner

FIG. 3
(A)
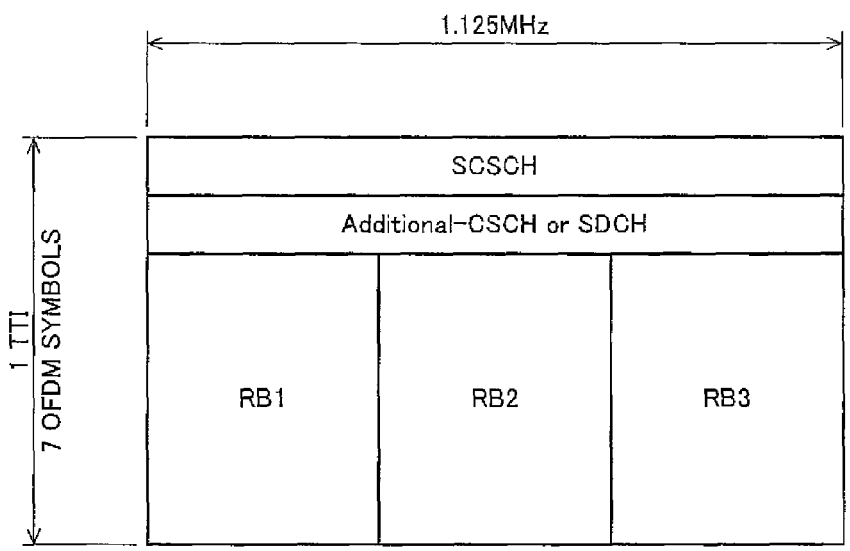
(B)
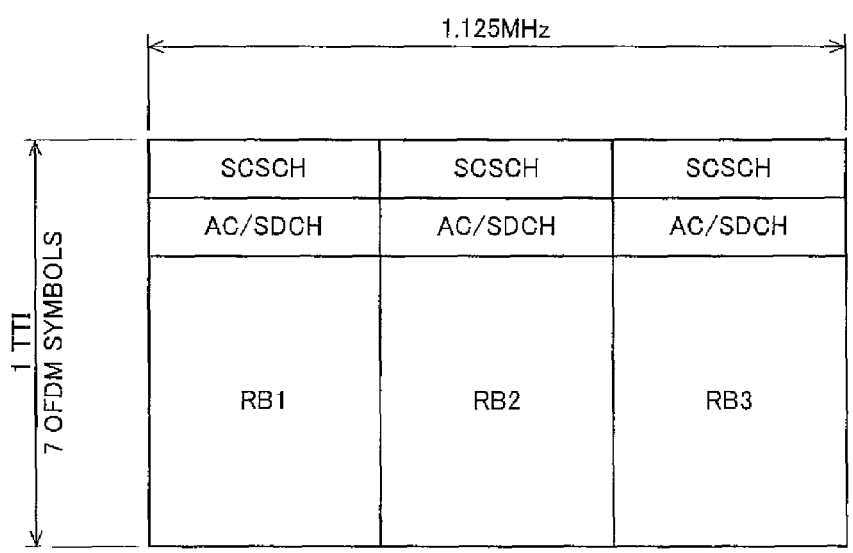

Chunk Table

Chunk Table

Chunk Table

Chunk Table
(MOBILE STATION 1)

Chunk Table
(MOBILE STATION 2)

FIG. 16

| Additional CSCH | | | | User2 SDCH | | | | User3 SDCH | | | |
|---|---|---|---|---|---|---|---|---|---|---|---|
| SCSCH | pilot | SCSCH | pilot | SCSCH | pilot | SCSCH | pilot | SCSCH | pilot | SCSCH | pilot |
| User1 SDCH | | | | User2 SDCH | | | | User3 SDCH | | | |

BASE STATION DEVICE, MOBILE STATION DEVICE, MOBILE STATION IDENTIFIER ALLOCATION METHOD, PROGRAM, AND RECORDING MEDIUM

TECHNICAL FIELD

The present invention relates to a base station device, a mobile station device, a mobile station identifier allocation method, a program, and a recording medium and, more particularly, to a technology of efficiently mapping information for assigning a mobile station when at the time of radio resource allocation while maintaining flexibility when radio resource allocation is performed in a time/frequency direction in a base station device.

BACKGROUND OF THE INVENTION

In 3GPP (3rd Generation Partnership Project), W-CDMA (Wideband Code Division Multiple Access) mode is standardized as a third-generation cellular mobile communication mode and the service is sequentially started (see, e.g., non-patent document 1). One W-CDMA mode is a spread spectrum mode of FDD with 5-MHz radio frequency bandwidth, and radio physical channels are differentiated by spread codes and code-multiplexed for transmission in the same radio frequency bandwidth.

The W-CDMA mode includes a radio link from the mobile station to the base station (hereinafter, uplink) and a radio link from the base station to the mobile station (hereinafter, downlink). The uplink and the downlink include logical channels (Logical Channel) at SAP (Service Access Point) between a layer 3 and a layer 2, transport channels (Transport Channel) for providing service from a layer 1 to the layer 2, and physical channels (Physical Channel) defined as a transmission channel between radio nodes (base station and mobile station) of the layer 1 for implementing transmission through the transport channel with the use of an actual radio transmission path (see, e.g., non-patent document 2).

The physical channels of the downlink of the W-CDMA are a common pilot channel CPICH (Common Pilot Channel), a synchronization channel SCH (Synchronization Channel), a paging indicator channel PICH (Paging Indicator Channel), a primary common control physical channel P-CCPCH (Primary Common Control Physical Channel), a secondary common control physical channel S-CCPCH (Secondary Common Control Physical Channel), a downlink dedicated physical data channel DPDCH (Dedicated Physical Data Channel), a downlink dedicated physical control channel DPCCH (Dedicated Physical Control Channel), an acquisition indicator channel AICH (Acquisition Indicat Channel), etc.

The physical channels of the uplink of the W-CDMA are a physical random access channel PRACH (Physical Random Access Channel), an uplink dedicated physical data channel DPDCH, and an uplink dedicated physical control channel DPCCH.

The high speed downlink packet access HSDPA (High Speed Downlink Packet Access) (non-patent document 3) mode, in which a downlink of the W-CDMA mode is applied to the high speed packet communication, is standardized.

The downlink physical channels of the HSDPA mode are a high-speed physical downlink shared channel HS-PDSCH (High Speed Physical Downlink Shared Channel) and an HS-DSCH-related shared control channel HS-SCCH (HS-DSCH-related Shared Control Channel).

The uplink physical channel of the HSDPA mode is an HS-DSCH-related uplink dedicated physical control channel HS-DPCCH (Dedicated Physical Control Channel for HS-DSCH).

The high-speed physical downlink shared channel HS-PDSCH of the HSDPA mode is a downlink shared channel shared by a plurality of mobile stations and includes a high-speed downlink shared channel HS-DSCH (High-Speed Downlink Shared Channel) of the transport channel for each mobile station. The HS-PDSH is used for transmitting packet data addressed to the mobile stations from a higher-level layer.

The HS-DSCH-related shared control channel HS-SCCH of the HSDPA mode is a downlink shared channel shared by a plurality of mobile stations and transmits to the mobile stations the information necessary for demodulating the high-speed physical downlink shared channel HS-DSCH (modulation mode, spread code) and the information necessary for an error-correcting decoding process and a hybrid automatic repeat request HARQ (Hybrid Automatic Repeat request) process.

The HS-DSCH-related uplink dedicated physical control channel HS-DPCCH is an uplink dedicated control channel and is used for transmitting downlink quality information CQI (Channel Quality Indication) representing a downlink radio propagation path status and ACK/NACK (Acknowledgement/Negative Acknowledgements) that is reception acknowledgement information corresponding to the hybrid automatic repeat request HARQ.

A control channel for each mobile station is transmitted through a dedicated physical control channel or identified by a shared control channel and mobile station identifier (RNTI: Radio Network Temporary ID). The mobile station identifier is 16-bit. For example, the HS-SCCH is code-multiplexed with HS-DSCH. Therefore, the HS-SCCH may be transmitted in a time (three-slot) range used by one mobile station for the HS-DSCH, and the HS-SCCH can sufficiently contain an information amount necessary for controlling the HS-DSCH (spread code, modulation mode, transport block size, HARQ process information, error-correcting decoding process information, mobile-station identifier, etc.,: a total of 37 bits when an encoding rate is 1.0). The mobile-station identifier is included in the error-correcting encoding process procedure to efficiently use a limited number of bits.

On the other hand, the evolution of the third generation radio access (Evolved Universal Terrestrial Radio Access, hereinafter, EUTRA) and the evolution of the third generation radio access network (Evolved Universal Terrestrial Radio Access Network, hereinafter, EUTRAN) are explored. The OFDM (Orthogonal Frequency Division Multiplexing) mode is proposed for the downlink of the EUTRA. The SUTRA technology applied to the OFDM mode is a technology such as adaptive modulation/demodulation error correction mode (AMCS: Adaptive Modulation and Coding Scheme, hereinafter, AMCS mode) based on adaptive radio link control (link adaptation) such as channel coding.

The AMCS mode is a mode of switching radio transmission parameters (hereinafter, AMC mode) such as an error correction mode, an encoding rate of error correction, a data modulation multi-valued number, a code spreading rate (SF: Spreading Factor) of time/frequency axes, and a multi-code multiplexing number depending on the propagation path statuses of the mobile stations to efficiently perform high-speed packet data transmission. For example, with regard to data modulation, the maximum throughput of a communication system can be increased by switching to the multi-valued modulation with higher efficiency such as from the QPSK (Quadrature Phase Shift Keying) modulation to the 8-PSK modulation and the 16-QAM (Quadrature Amplitude Modulation) modulation as the propagation path status is improved.

With regard to disposition of the downlink physical channels and the transport channels in the OFDM mode, a method of multiplexing the physical control channel and the physical data channel in the same frequency band through the spread code multiplexing is proposed for the Spread-OFDM mode (see, e.g., Patent Document 1). In a method proposed for the Non Spread-OFDM mode (e.g., wireless LAN standard 802.16), the resources of the frequency axis (sub-carrier) and the time axis (OFDM symbol) of the OFDM are used to multiplex the channels in time/frequency through the time division multiplexing TDM (Time Division Multiplexing), the frequency division multiplexing FDM (Frequency Division Multiplexing), or a combination of TDM/FDM.

Although the technical information of the EUTRA (see Non-Patent Document 5) describes a configuration of a downlink radio frame, the radio frame is divided in the frequency direction and the time direction, and data for mobile stations are mapped on divided blocks. To perform this data mapping, the base station must transmit allocation information of the mobile stations for the blocks through the mobile station identifier, etc.

Patent Document 1: Japanese Laid-Open Patent Publication No. 2001-237803

Patent Document 2: Japanese Laid-Open Patent Publication No. 2004-297756

Non-patent Document 1: 3GPP TS 25.211, V6.4.0 (2005-03), Physical channels and mapping of transport channels onto physical channels, http://www.3gpp.org/ftp/Specs/html-info/25-series.htm Non-patent Document 2: Keiji Tachikawa, "W-CDMA Mobile Communications System", ISBN4-621-04894-5, P103, P115, etc.

Non-patent Document 3: 3GPP TR (Technical Report) 25.858, and 3GPP documents related to HSDPA specifications, http://www.3gpp.org/ftp/Specs/html-info/25-series.htm Non-patent Document 4: R1-050705 "Pilot Channel Structure in Evolved UTRA Downlink" 3GPP TSG RAN WG1 #42 on LTE London, UK, Aug. 29-Sep. 2, 2005

Non-patent Document 5: R1-050707 "Physical Channels and Multiplexing in Evolved UTRA Downlink" 3GPP TSG RAN WG1 #42 on LTE London, UK, Aug. 29-Sep. 2, 2005

Non-patent Document 6: R1-050852 "CQI-based Transmission Power Control for Control Channel in Evolved UTRA" 3GPP TSG RAN WG1 #42 on LTE London, UK, Aug. 29-Sep. 2, 2005

DISCLOSURE OF THE INVENTION

Problems to be Solved by the Invention

However, no details are given about what control information is used to exchange data mapping information between mobile stations and base stations in the EUTRA in the above patent documents.

If 16 bits are necessary for the mobile station identifier and different mobile stations can be allocated to respective blocks for improving the flexibility of the block allocation of the mobile stations as in the case of the WCDMA, at least the number of blocks×16 bits of information is necessary.

For example, in a system with 20-MHz frequency bandwidth, the number of blocks allocatable to mobile stations is 960 per radio frame and, considering the uplink control information, overhead of the control information is not negligible. That is, it is a critical challenge to reduce the number of bits necessary for the mobile station identifier occupying the largest portion of the control information.

The present invention was conceived to solve the above problems and it is therefore the object of the present invention to provide a base station device, a mobile station device, a mobile station identifier allocation method, a program, and a recording medium efficiently controlling radio resource allocation information for mobile stations to improve frequency utilization efficiency of overall communication system and to enable efficient control of base stations/mobile stations.

Means for Solving the Problems

In order to solve the above problems, a first technical means is a base station device assigning a resource used by a mobile station device for each resource block made up of a frequency component and a time component in a mobile communication system, the base station device assigning for a mobile station device a resource block group including at least one or more resource blocks likely to be used by the mobile station device, the base station device allocating to the mobile station device a first mobile station identifier for identifying the mobile station device among one or more mobile station devices having the resource block group assigned.

A second technical means is the base station device as defined in the first technical means, wherein the resource block group information and the first mobile station identifier are included in connection control information transmitted at the start of communication or during communication and are transmitted to the mobile station device.

A third technical means is the base station device as defined in the first technical means, wherein a plurality of resource block groups is assigned for the mobile station device.

A fourth technical means is the base station device as defined in the third technical means, wherein one or more different combinations of mobile station devices are assigned for each of the plurality of assigned resource block groups, and wherein the first mobile station identifier for identifying the mobile station device is allocated for each of the resource block groups.

A fifth technical means is the base station device as defined in the first technical means, wherein the first mobile station identifier is included in shared control information and is transmitted to the mobile station device.

A sixth technical means is the base station device as defined in the fifth technical means, wherein information assigning presence or absence of additional shared control information is included in the shared control information for transmission.

A seventh technical means is the base station device as defined in the sixth technical means, wherein a second mobile station identifier unique to the mobile station device at least within the base station device or a portion thereof is included in the additional shared control information and is transmitted to the mobile station device.

An eighth technical means is the base station device as defined in the first technical means, wherein the resource used by the mobile station device is a resource used at the time of reception from the base station device by the mobile station device.

A ninth technical means is the base station device as defined in the first technical means, wherein the resource used by the mobile station device is a resource used at the time of transmission to the base station device by the mobile station device.

A tenth technical means is the base station device as defined in the fourth technical means, wherein the first mobile station identifier allocated to the mobile station device for each of the resource block groups is the same for the plurality of resource block groups.

An eleventh technical means is a base station device used in a mobile communication system, the base station device assigning for a mobile station device at least one or more mobile station identifier field groups likely to be used by the mobile station device among mobile station identifier field groups in shared control information assigning a resource used at the time of reception from or transmission to the base station device by the mobile station device, the base station device allocating to the mobile station device a third mobile station identifier for identifying the mobile station device among one or more mobile station devices having the mobile station identifier field groups assigned.

A twelfth technical means is the base station device as defined in the eleventh technical means, wherein the mobile station identifier field group information and the third mobile station identifier are included in connection control information transmitted at the start of communication or during communication and are transmitted to the mobile station device.

A thirteenth technical means is the base station device as defined in the eleventh technical means, wherein a plurality of mobile station identifier field groups is assigned for the mobile station device.

A fourteenth technical means is the base station device as defined in the thirteenth technical means, wherein one or more different combinations of mobile station devices are assigned for each of the plurality of mobile station identifier field groups, and wherein the third mobile station identifier for identifying the mobile station device is allocated for each of the mobile station identifier field groups.

A fifteenth technical means is the base station device as defined in the eleventh technical means, wherein the third mobile station identifier is included in shared control information and is transmitted to the mobile station device.

A sixteenth technical means is the base station device as defined in the fifteenth technical means, wherein information assigning presence or absence of additional shared control information is included in the shared control information for transmission.

A seventeenth technical means is the base station device as defined in the sixteenth technical means, wherein a second mobile station identifier unique to the mobile station device at least within the base station device or a portion thereof is included in the additional shared control information and is transmitted to the mobile station device.

An eighteenth technical means is the base station device as defined in the eleventh technical means, wherein the mobile station identifier field group assigns a resource used at the time of reception from the base station device by the mobile station device.

A nineteenth technical means is the base station device as defined in the eleventh technical means, wherein the mobile station identifier field group assigns a resource used at the time of transmission to the base station device by the mobile station device.

A twentieth technical means is the base station device as defined in the fourteenth technical means, wherein each of the third mobile station identifier allocated to the mobile station device for each of the mobile station identifier field groups is the same for the plurality of mobile station identifier field groups.

A twenty-first technical means is a mobile station device having a resource to be used assigned by a base station device for each resource block made up of a frequency component and a time component in a mobile communication system, the mobile station device receiving from shared control information a first mobile station identifier for identifying the mobile station device among one or more mobile station devices having a resource block group assigned, the resource block group including at least one or more resource blocks likely to be used by the mobile station device assigned by the base station device.

A twenty-second technical means is the mobile station device as defined in the twenty-first technical means, wherein the resource block group information and the first mobile station identifier are received through connection control information transmitted at the start of communication or during communication from the base station device.

A twenty-third technical means is the mobile station device as defined in the twenty-first technical means, wherein the mobile station device has one or more resource block groups assigned by the base station device and wherein the first mobile station identifier for identifying the mobile station device for each of the resource block groups is allocated for each of the plurality of assigned resource block groups.

A twenty-fourth technical means is the mobile station as defined in the twenty-first technical means, wherein presence or absence of additional shared control information is determined by receiving information assigning presence or absence of the additional shared control information included in the shared control information.

A twenty-fifth technical means is the mobile station device as defined in the twenty-fourth technical means, wherein a resource block group including data to the own station is determined with a second mobile station identifier unique to the mobile station device at least within the base station device or a portion thereof included in the additional shared control information.

A twenty-sixth technical means is the mobile station device as defined in the twenty-first technical means, wherein the resource used by the mobile station device is a resource used at the time of reception from the base station device by the mobile station device.

A twenty-seventh technical means is the mobile station device as defined in the twenty-first technical means, wherein the resource used by the mobile station device is a resource used at the time of transmission to the base station device by the mobile station device.

A twenty-eighth technical means is the mobile station device as defined in the twenty-third technical means, wherein the first mobile station identifier allocated for each of the resource block groups is the same for the plurality of resource block groups.

A twenty-ninth technical means is a mobile station device used in a mobile communication system, the mobile station device receiving a third mobile station identifier for identifying the mobile station device among one or more mobile station devices having at least one or more assigned mobile station identifier field groups likely to be used by the mobile station device assigned by a base station device among mobile station identifier field groups in shared control information assigning a resource used at the time of reception from or transmission to the base station device by the mobile station device.

A thirtieth technical means is the mobile station device as defined in the twenty-ninth technical means, wherein the mobile station identifier field group information and the third mobile station identifier are received through connection control information transmitted at the start of communication or during communication from the base station device.

A thirty-first technical means is the mobile station device as defined in the twenty-ninth technical means, wherein the mobile station device has one or more mobile station identifier field groups assigned by the base station device and wherein the third mobile station identifier for identifying the mobile station device for each of the mobile station identifier field groups is allocated for each of the plurality of the mobile station identifier field groups.

A thirty-second technical means is the mobile station as defined in the twenty-ninth technical means, wherein presence or absence of additional shared control information is determined by receiving information assigning presence or absence of the additional shared control information included in the shared control information.

A thirty-third technical means is the mobile station device as defined in the thirty-second technical means, wherein a resource block group including data to the own station is determined with a second mobile station identifier unique to the mobile station device at least within the base station device or a portion thereof included in the additional shared control information.

A thirty-fourth technical means is the mobile station device as defined in the twenty-ninth technical means, wherein the mobile station identifier field assigns a resource used at the time of reception from the base station device by the mobile station device.

A thirty-fifth technical means is the mobile station device as defined in the twenty-ninth technical means, wherein the mobile station identifier field assigns a resource used at the time of transmission to the base station device by the mobile station device.

A thirty-sixth technical means is the mobile station device as defined in the thirty-first technical means, wherein the third mobile station identifier allocated for each of the plurality of mobile station identifier field groups is the same for the plurality of mobile station identifier field groups.

A thirty-seventh technical means is a mobile station identifier allocation method used in a mobile communication system, wherein a base station device assigns a resource used by a mobile station device for each resource block made up of a frequency component and a time component, wherein the base station device assigns for a mobile station device a resource block group including at least one or more resource blocks likely to be used by the mobile station device, and wherein the base station device allocates to the mobile station device a first mobile station identifier for identifying the mobile station device among one or more mobile station devices having the resource block group assigned.

A thirty-eighth technical means is a mobile station identifier allocation method used in a mobile communication system, wherein a base station device assigns for a mobile station device at least one or more mobile station identifier field groups likely to be used by the mobile station device, and wherein the base station device allocates to the mobile station device a third mobile station identifier for identifying the mobile station device among one or more mobile station devices having the mobile station identifier field groups assigned.

A thirty-ninth technical means is a program operable to drive a computer to implement functions of the base station device as defined in any one of the first to the twentieth technical means or the mobile station device as defined in any one of the twenty-first to the thirty-sixth technical means.

A fortieth technical means is a recording medium having recorded thereon the program as defined in the thirty-ninth technical means in a computer-readable manner.

Effect of the Invention

The present invention can provide a base station device, a mobile station device, a mobile station identifier allocation method, a program, and a recording medium efficiently controlling radio resource allocation information for mobile stations to improve frequency utilization efficiency of overall communication system and to enable efficient control of base stations/mobile stations.

BRIEF DESCRIPTION OF THE DRAWINGS

FIG. 3 is a view of an exemplary configuration of a downlink Chunk applied to the present invention.

FIG. 16 is a view of an exemplary Chunk configuration if three users share RB through one Chunk.

EXPLANATIONS OF REFERENCE NUMERALS

100 . . . base station; 101 . . . antenna portion; 102 . . . radio portion; 103 . . . demodulating portion; 104 . . . link channel estimating portion; 105 . . . control data extracting portion; 106 . . . channel decoding portion; 107 . . . channel coding portion; 108 . . . control data inserting portion; 109 . . . OFDM modulating portion; 110 . . . scheduling portion; 200 . . . mobile station; 201 . . . antenna portion; 202 . . . radio portion; 203 . . . OFDM demodulating portion; 204 . . . link channel estimating portion; 205 . . . control data extracting portion; 206 . . . channel decoding portion; 207 . . . channel coding portion; 208 . . . control data inserting portion; 209 . . . modulating portion; and 210 . . . control portion.

PREFERRED EMBODIMENTS OF THE INVENTION

Figure 1:
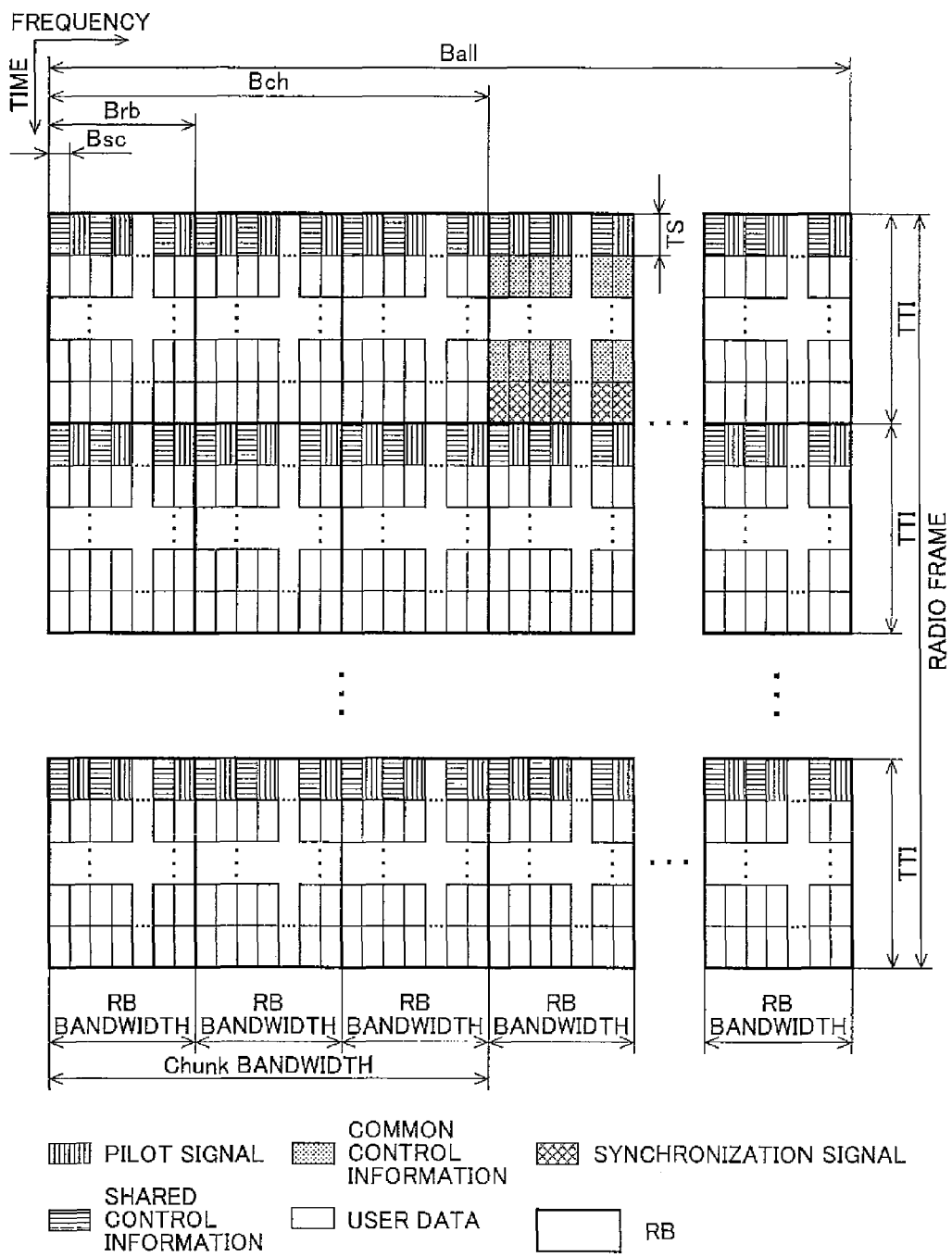
FIG. 1 is a view of an exemplary configuration of a downlink radio frame assumed based on the proposition of 3GPP for the EUTRA.

FIG. 1 is a view of an exemplary configuration of a downlink radio frame assumed based on the proposition of 3GPP for the EUTRA (see Non-Patent Document 4 to Non-Patent Document 6). As shown in FIG. 1, a downlink radio frame is made up of a plurality of blocks which are radio resource units used in communication. This block is hereinafter referred to as a Chunk.

A Chunk is made up of a plurality of sub-blocks, each of which is a minimum unit defined by a sub-channel serving as a frequency component corresponding to one or a plurality of sub-carriers and a sub-slot serving as a time component corresponding to one or a plurality of OFDM symbols. A sub-block used for user data is hereinafter referred to as an RB (Resource Block).

A Chunk is two-dimensionally represented with a Chunk bandwidth on the frequency axis and slots on the time axis. These slots are referred to as TTIs (Transmission Time Intervals). For example, if the entire band (downlink frequency bandwidth) Ball of the downlink is 20 MHz; a Chunk bandwidth Bch is 1.125 MHz; an RB bandwidth Brb is 375 kHz; a sub-carrier frequency bandwidth Bsc is 15 kHz; a length of one radio frame is 10 ms; TTI is 0.5 ms; RB sub-slot is 0.5 ms; and a guard band is 2 MHz, one radio frame is made up of 48 RBs in the frequency axis direction and 20 RBs in the time axis direction, i.e., 960 RBs. Therefore, positions of RBs in a radio frame can be represented by an array F(f,t), where f is a frequency direction location number and t is a sub-slot number. For example, the above example corresponds to $1 \leq f \leq 48$ and $1 \leq t \leq 20$.

Although the Chunk bandwidth Bch may be 5 MHz in some configurations, the Chunk bandwidth Bch is 1.125 MHz in the following description. If the Chunk bandwidth Bch is equal to the entire band Ball of downlink, an entire sub-slot forms one Chunk.

Figure 2:
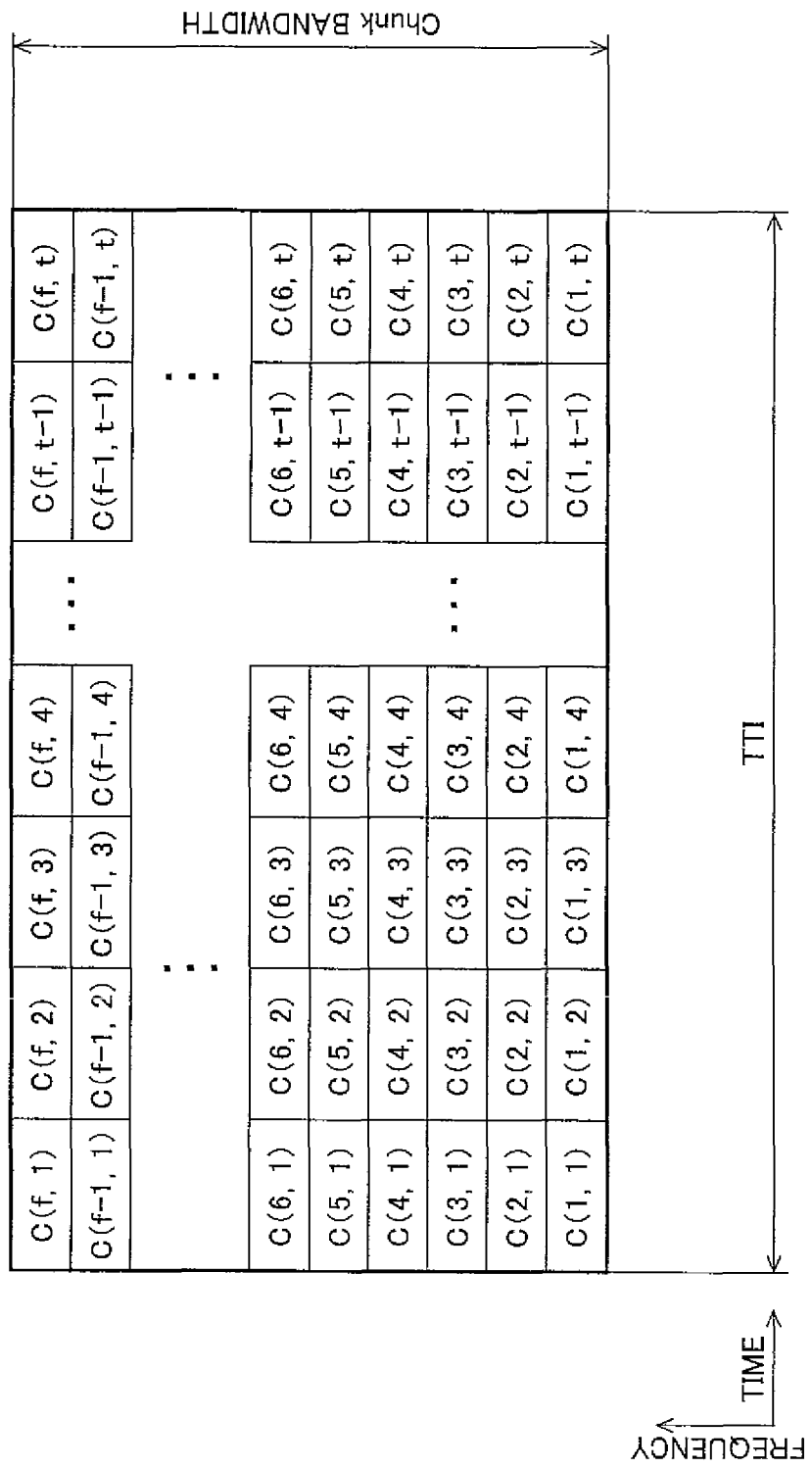
FIG. 2 is a view for explaining an exemplary representation of an array in one Chunk.

One Chunk includes 75 sub-carriers, and if an OFDM symbol length Ts is 0.07 ms, it is known from calculation that one Chunk includes seven OFDM symbols. Therefore, as shown in FIG. 2, one Chunk can be represented by an array C(f,t), where f is a subcarrier number and t is an OFDM symbol number. For example, the above example corresponds to $1 \leq f \leq 75$ and $1 \leq t \leq 7$.

The Chunk is mapped with
(1) user data used by a user,
(2) physical and layer-2 control messages (hereinafter, "shared control information") included in a shared control signaling channel SCSCH (Shared Control Signaling Channel) having stored thereon transmission parameters such as mobile station identifier (GE identity), a modulation mode, an error correction mode, information necessary for a hybrid automatic repeat request HARQ (Hybrid Automatic Repeat request) process, and a data length, and
(3) a known pilot signal used for estimation of a propagation path for demodulating the control data and the user data.

At the beginning of a radio frame, (1) a synchronization signal for synchronization of the frame and (2) common control information for notification of the entire configuration of the frame are mapped.

In Non-Patent Document 5, channels of the downlink physical layer are defined as
(1) DPCH (Pilot channel) (pilot signal),
(2) CCCH (Common control channel) (common control information),
(3) SCSCH (Shared control signaling channel) (shared control information),
(4) SDCH (Shared data channel) (user data),
(5) MBMSCH (Multicast/Broadcast channel), and
(6) DSNCH (Downlink synchronization channel) (synchronization signal).

The block (Chunk) sending data addressed to a mobile station (user, mobile station) is basically made up of the Pilot channel (pilot signal), the Shared control signaling channel (shared control information), and the Shared data channel (user data).

The DPCH is used for electric power measurement when performing cell search or handover, CQI measurement for performing adaptive modulation, and channel estimation for demodulating the shared control information and the user data.

The SCSCH includes control information necessary for demodulating the user data, such as a modulation mode of the Chunk, a data length, a position of data addressed to the own station in the Chunk, and information of Hybrid ARQ, and also includes the control information for Uplink from a mobile station such as power control, transmission timing control, timing when the own station should perform transmission, a modulation mode, a data length, and ACK/NACK to data transmitted by a mobile station.

The SDCH is user data of the Chunk. The SDCH is shared by a plurality of users in some cases.

Information in the shared control information such as a modulation mode and a data length is necessary for demodulating the user data, and the pilot signal is used for propagation path compensation to demodulate the shared control information.

FIG. 3 is a view of an exemplary configuration of a downlink Chunk applied to the present invention. The Chunk is configured as a block with Bch=1.125 MHz and one TTI (0.5 ms) in the time direction and includes three RBs (Brb=375 MHz).

In FIG. 3(A), the SCSCH is disposed as control information of the entire Chunk in a 1.125-MHz band. The Chunk also includes an area shared and utilized as RB control information (Additional-CSCH) or an RB user data area (SDCH), and RB user data areas (SDCH).

On the other hand, in FIG. 3(B), the Chunk is completely divided into RBs, and the SCSCH is disposed as RB control information in every 375-MHz bands. The RB is made up of an area shared and utilized as RB control information (Additional-CSCH (AC)) or an RB user data area (SDCH), and an RB user data area (SDCH).

Since the control information is made up of two stages of the SCSCH and the Additional-CSCH, the control information to be checked can hierarchically be configured in accordance with types of mobile stations. In this configuration, whether the Additional-CSCH and the SDCH must be demodulated is determined with SCSCH and the Additional-CSCH and the SDCH can be demodulated only by necessary mobile stations, the mobile stations can efficiently execute processes.

It is assumed that a size of the uplink RB is 1.125 MHz×one TTI and it is desirable to dispose the uplink control information in every 1.125-MHz bands. Therefore, a simplified configuration can be achieved with the SCSCH as shown in FIG. 3(A). However, a configuration of FIG. 3(B) can also be achieved by distributing the information.

Figure 4:
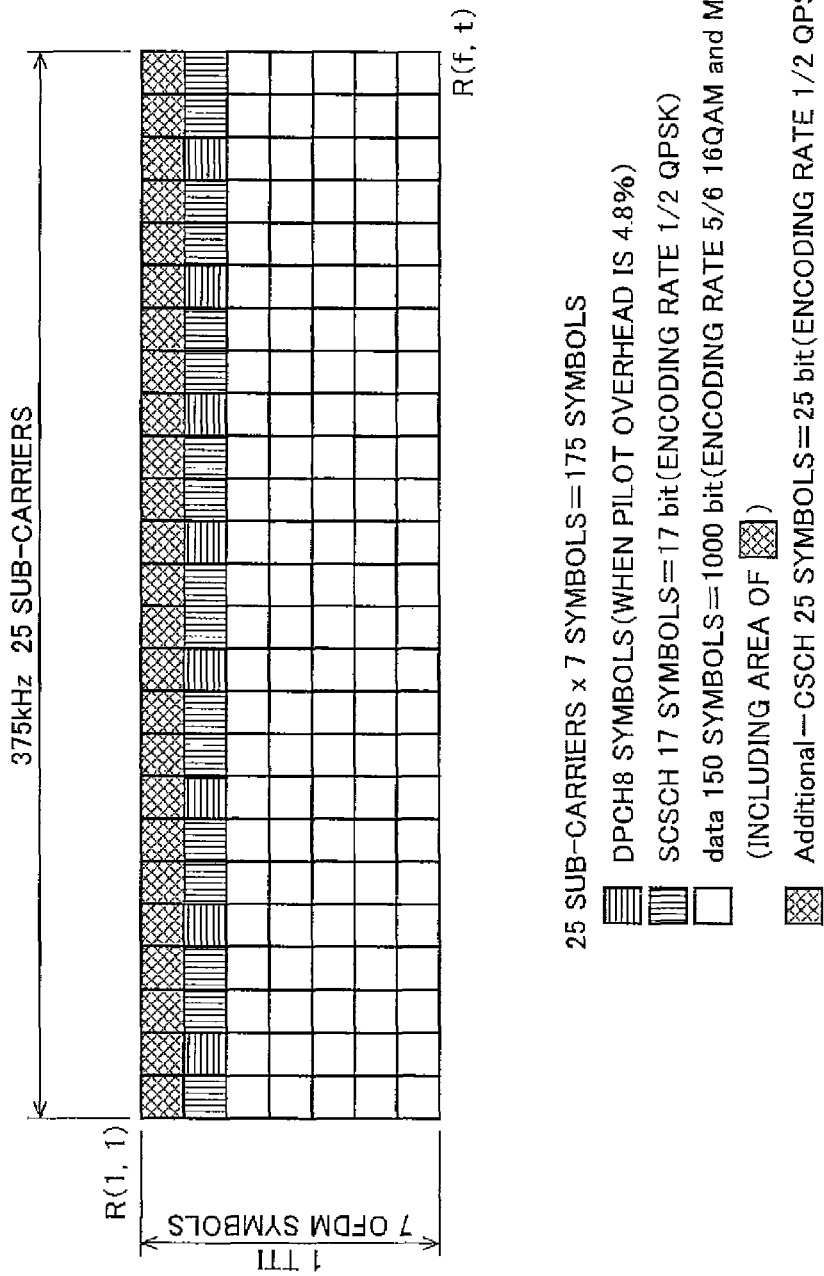
FIG. 4 is a view of an exemplary configuration of a downlink RB applied to the present invention.

FIG. 4 is a view of an exemplary configuration of a downlink RB applied to the present invention. One Chunk includes 75 sub-carriers, and if an OFDM symbol length Ts is 0.07 ms, it is known from calculation that one RB includes seven OFDM symbols and 25 sub-carriers. Therefore, one RB can be represented by an array R(f,t), where f is a subcarrier number and t is an OFDM symbol number. For example, the above example corresponds to $1 \leq f \leq 25$ and $1 \leq t \leq 7$.

The DPCH is disposed at R(x,2) (x=2, 5, 8, 11, 14, 17, 20, and 23) and the SCSCH is mapped among the DPCH. Although overhead of the pilot signal in the radio frame is about 4.8% in this configuration and the pilot signal can further be increased, the number of symbols allocated to the SCSCH is reduced in such a case. The area shared and utilized as the RB control information (Additional-CSCH) or the user data area (SDCH) is disposed at R(x,1) ($1 \leq x \leq 25$). The user data area (SDCH) is disposed at R(x,y) ($1 \leq x \leq 25$, $3 \leq y \leq 7$).

Although the SCSCH is mapped among the DPCH, the RB control information (Additional-CSCH) and the DPCH may be mapped at R(x,2) and the SCSCH may be mapped at R(x,1).

In the case of the configuration of FIG. 3(A), one SCSCH is formed by combining areas of three RBs included in the Chunk. Although the number of bits allocatable to each channel is changed depending on a modulation mode and an encoding rate, the SCSCH is 17-bit in the case of modulation with the modulation mode QPSK and an encoding rate of 1/2, for example. Therefore, in the case of the configuration of FIG. 3(A), the SCSCH of one Chunk is 51-bit.

The user data is about 1000-bit including the shared area of the Additional-CSCH in the case of using the modulation mode 16QAM, an encoding rate of 5/6, and MIMO (Multi-Input Multi-Output). The Additional-CSCH is 25-bit in the case of modulation with the modulation mode QPSK and an encoding rate of 1/2.

The number of bits of the SCSCH is 51 bits per Chunk, and if the mobile station identifier is 16-bit, the SCSCH can only contain the mobile station identifier of three mobile stations. Since the control information and the control information of both the uplink and the downlink must be contained, a method of considerably reducing the mobile station identifier is required.

Figure 5:
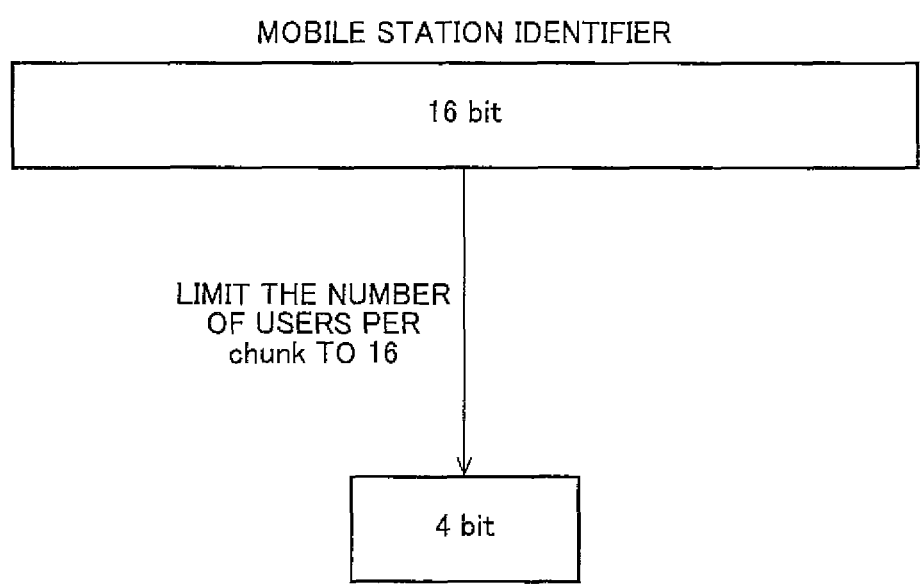
FIG. 5 is a view for explaining how the number of users allocated to one Chunk or 1RB is limited.

In the present invention, as shown in FIG. 5, the number of users allocated to one Chunk or one RB is limited. The mobile station identifier is information prepared for uniquely identifying mobile stations in a range including a plurality of base stations and it is redundant to use the information for scheduling within a base station. For example, if the number of users allocated to one Chunk is limited to 16, the identifier used in one Chunk can be represented by four bits. This identifier is hereinafter referred to as Chunk ID (CID). However, although the number of bits assigning a mobile station can be reduced in the SCSCH, a process procedure of conversion between the mobile station identifier and the CID is necessary in this method. This process procedure will be described later.

The process procedure of conversion between the mobile station identifier and the CID will be described with reference to FIGS. 6 to 12.

Figure 6:
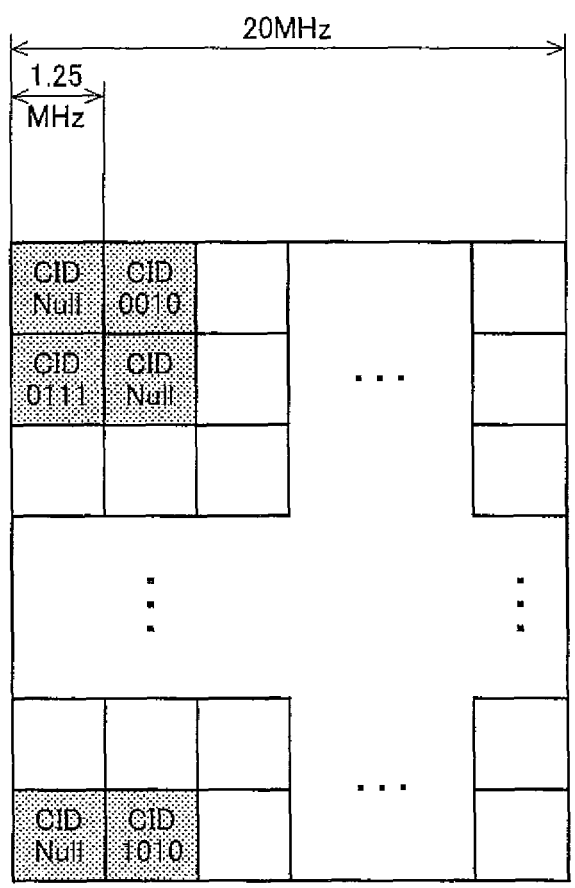
FIG. 6 is a view of an example of a conversion table (Chunk Table) for mobile station identifier and CID retained in base stations and mobile stations.

FIG. 6 is a view of an example of a conversion table (Chunk Table) for the mobile station identifier and the CID retained in base stations and mobile stations. The Chunk Table preliminarily retains usable Chunk positions in accordance with the maximum transmission/reception abilities and the service types of mobile stations. In the case of FIG. 6, a mobile station can use several TTIs in 2.5-MHz band among 20-MHz base station bandwidth.

Figure 7:
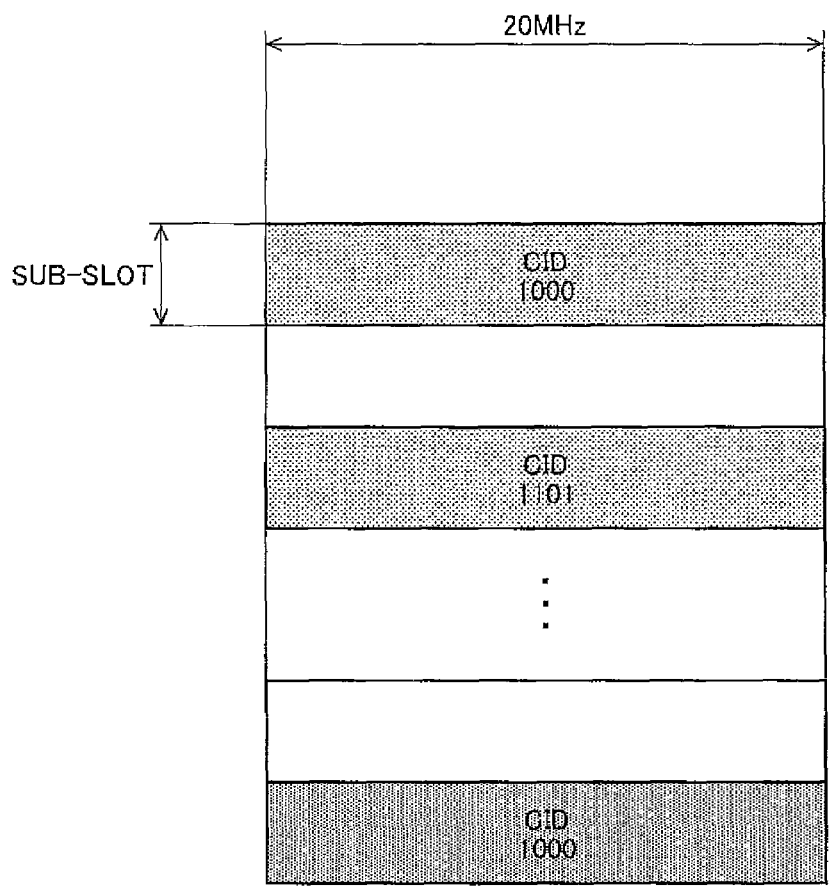
FIG. 7 is a view of another example of the conversion table (Chunk Table) for mobile station identifier and CID.

FIG. 7 is a view of another example of the Chunk Table. The example of FIG. 7 shows the Chunk Table when both the Chunk bandwidth Bch and the entire downlink band are 20-MHz.

Figure 8:
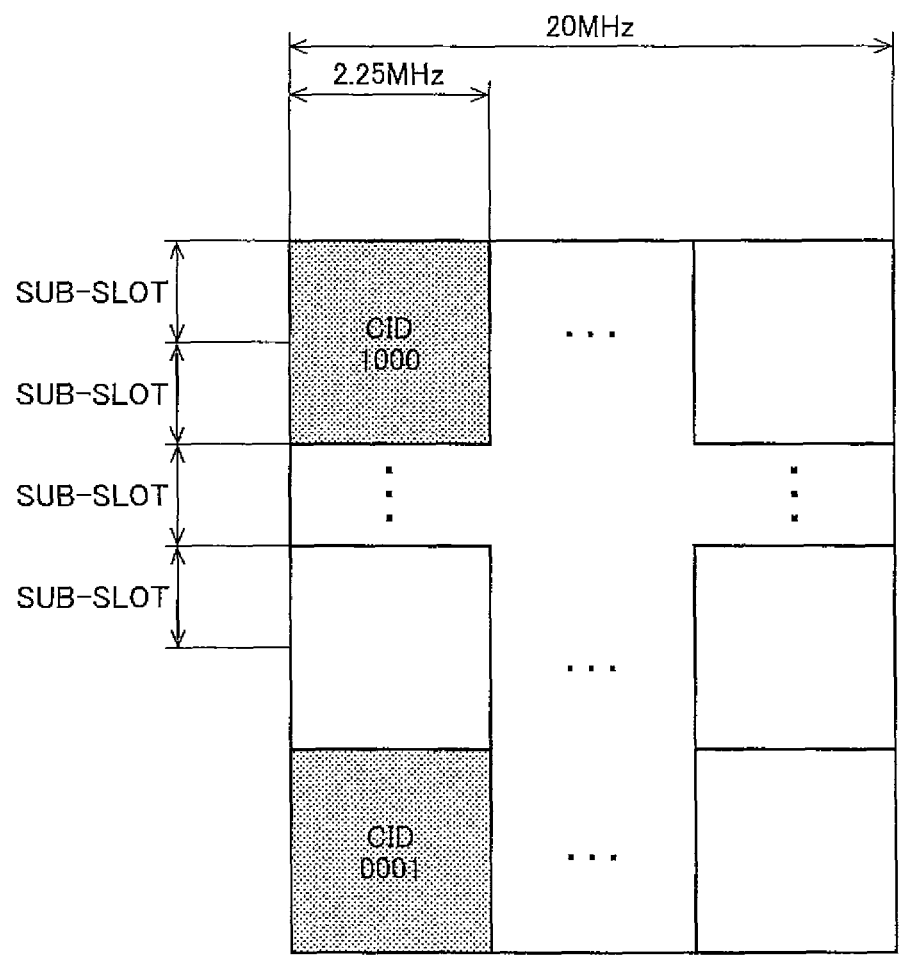
FIG. 8 is a view of yet another example of the conversion table (Chunk Table) for mobile station identifier and CID.

FIG. 8 is a view of yet another example of the Chunk Table. In the example of FIG. 8, the Chunk is made up of RBs grouped over a plurality of sub-slots and the CID can be allocated to the RB groups. However, in this case, the mobile stations are called through the SCSCH of respective sub-slots.

Figure 9:
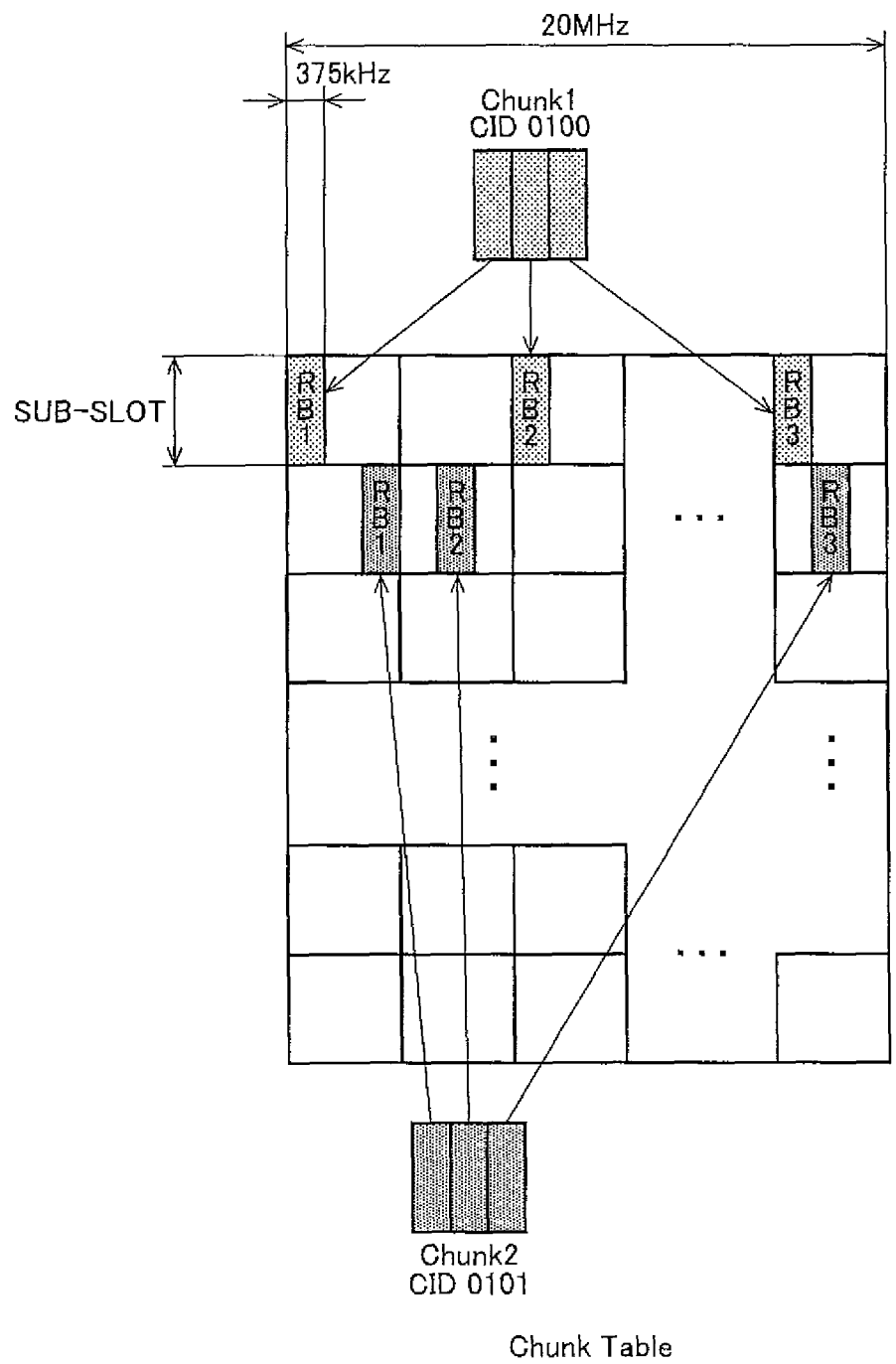
FIG. 9 is a view of yet another example of the conversion table (Chunk Table) for mobile station identifier and CID.

FIG. 9 is a view of yet another example of the Chunk Table. In this configuration of the Chunk, the RBs located at positions distributed in the frequency direction are grouped, instead of grouping RBs successive in the frequency direction. It is assumed that both the base station and the mobile stations know this RB grouping configuration. The position of the CID and the positions of the RBs in the SCSCH are correlated in advance.

Figure 10:
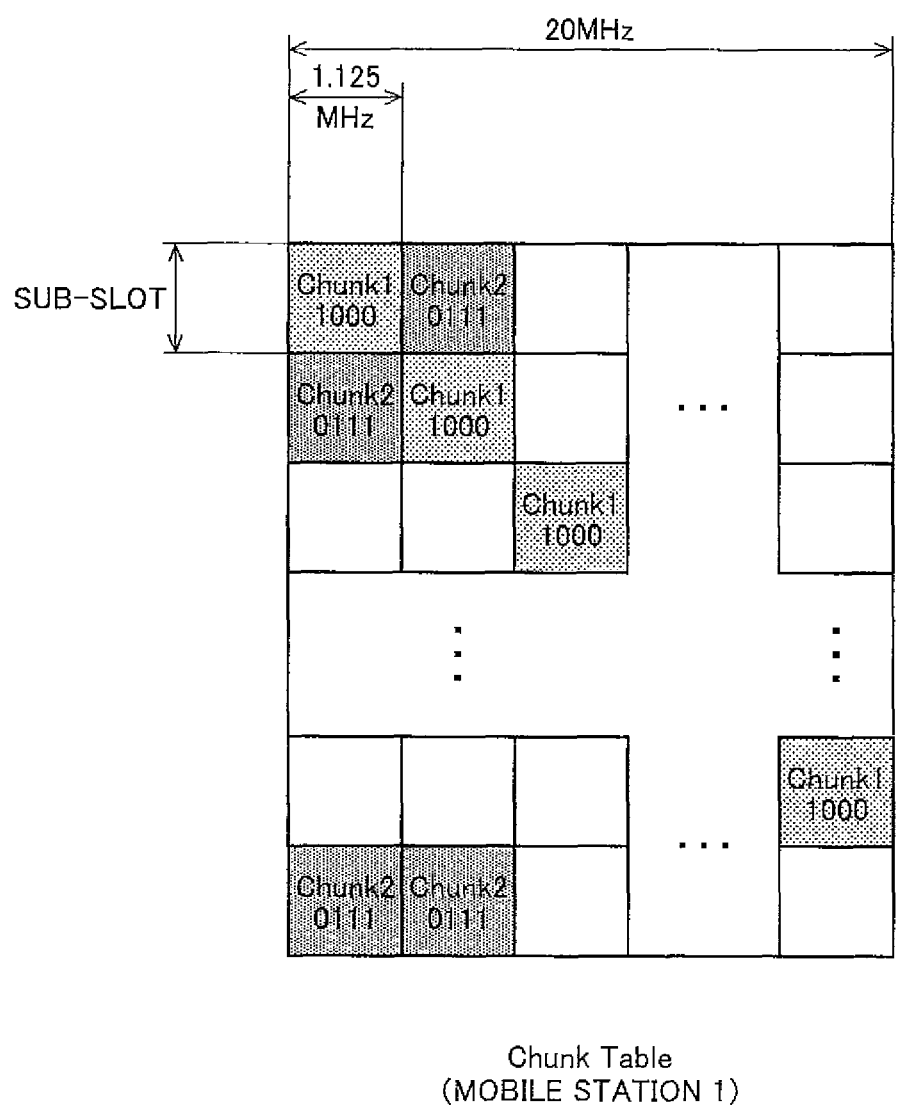
FIG. 10 is a view of another example of the conversion table (Chunk Table) for mobile station identifier and CID.

FIG. 10 is a view of yet another example of the Chunk Table. In the example of FIG. 10, the Chunk is made up of RBs grouped over a plurality of sub-slots and the CID can be allocated to a certain pattern of the RB groups. A mobile station 1 has a Chunk 1 and a Chunk 2 as available Chunks, and Nos. 1000 and 0111 are respectively allocated as the CID. However, the mobile station 1 is called through the SCSCH of respective sub-slots.

Figure 11:
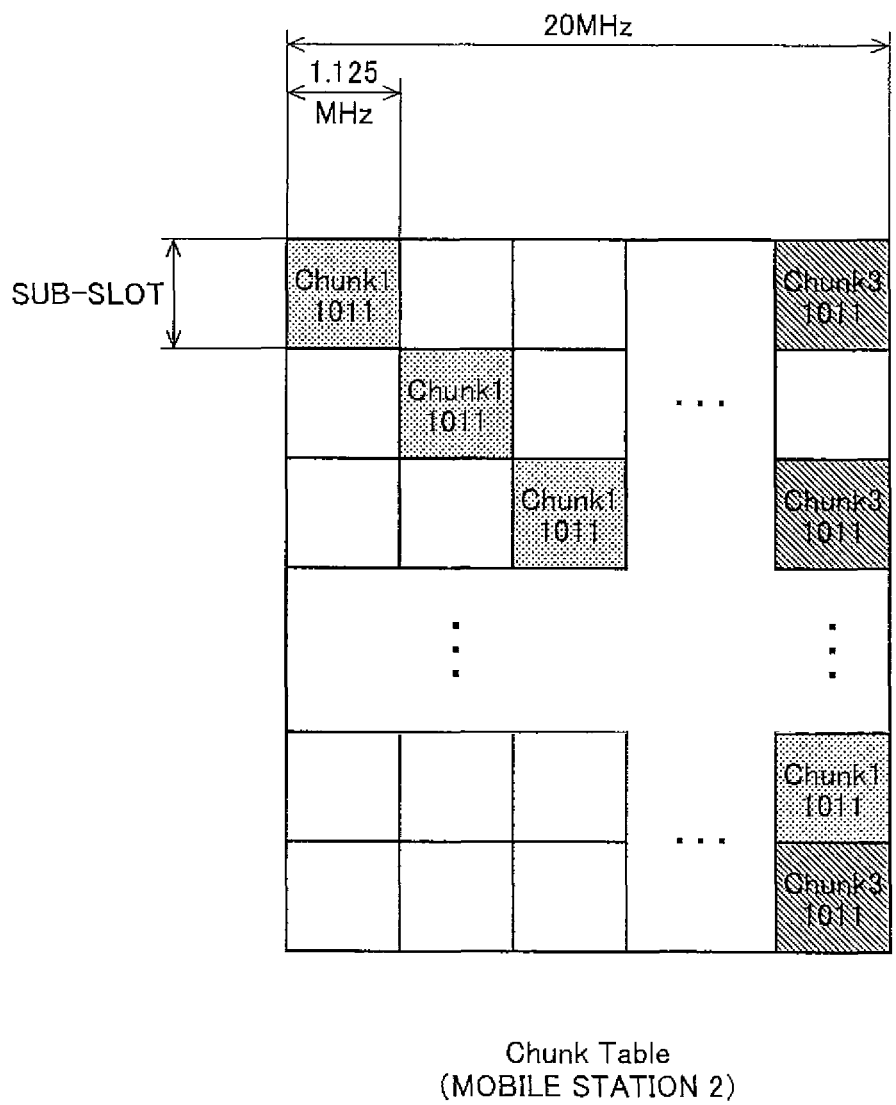
FIG. 11 is a view of an example of Chunk Table of a mobile station different from that of FIG. 9.

FIG. 11 is a view of an example of a Chunk Table of a mobile station (mobile station 2) different from that of FIG. 10. A Chunk 1 is also allocated to the mobile station 2. Nos. 1011 and 1011 are respectively allocated as the CID of the Chunk 1 and a Chunk 3 for the mobile station 2.

If a mobile station already has the CID of an available Chunk, a value of the CID is retained in the table. Otherwise, Null is retained. The CID acquisition by the mobile station is performed by transmitting information of the CID from the base station to the mobile station in advance at the start of communication or by a CID acquisition process as shown in FIG. 12.

Figure 12:
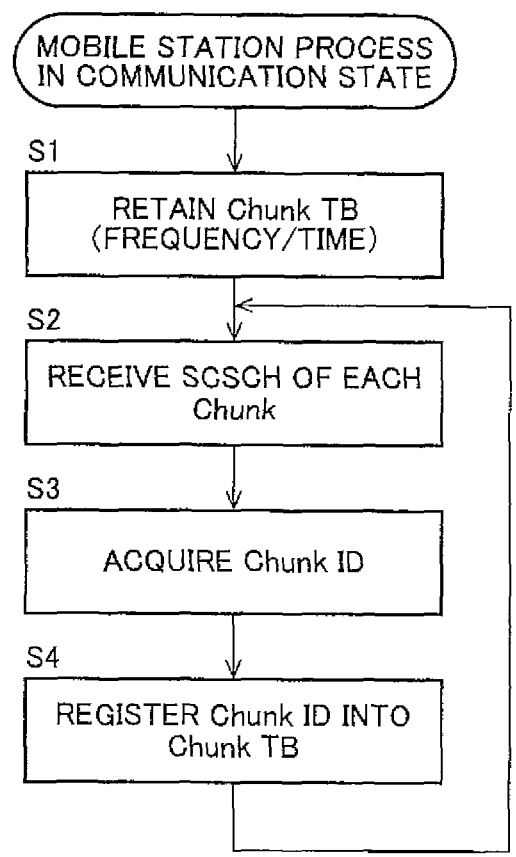
FIG. 12 is a view for explaining a process procedure of conversion between mobile station identifier and CID.

As shown in FIG. 12, a mobile station preliminarily retains a Chunk Table (TB) (S1). The mobile station sequentially receives the SCSCH of the predetermined available Chunks from the beginning of the radio frame (32). If the mobile station identifier of the own station is assigned in the SCSCH, the mobile station receives the SDCH of the corresponding RB to acquire the CID (Chunk ID) (S3). The user data may also be included in the SDCH in this situation. The mobile station registers the acquired CID into the Chunk Table (S4). The base station also has the Chunk Tables for the respective mobile stations to manage whether the CIDs are allocated to the mobile stations.

Figure 13:
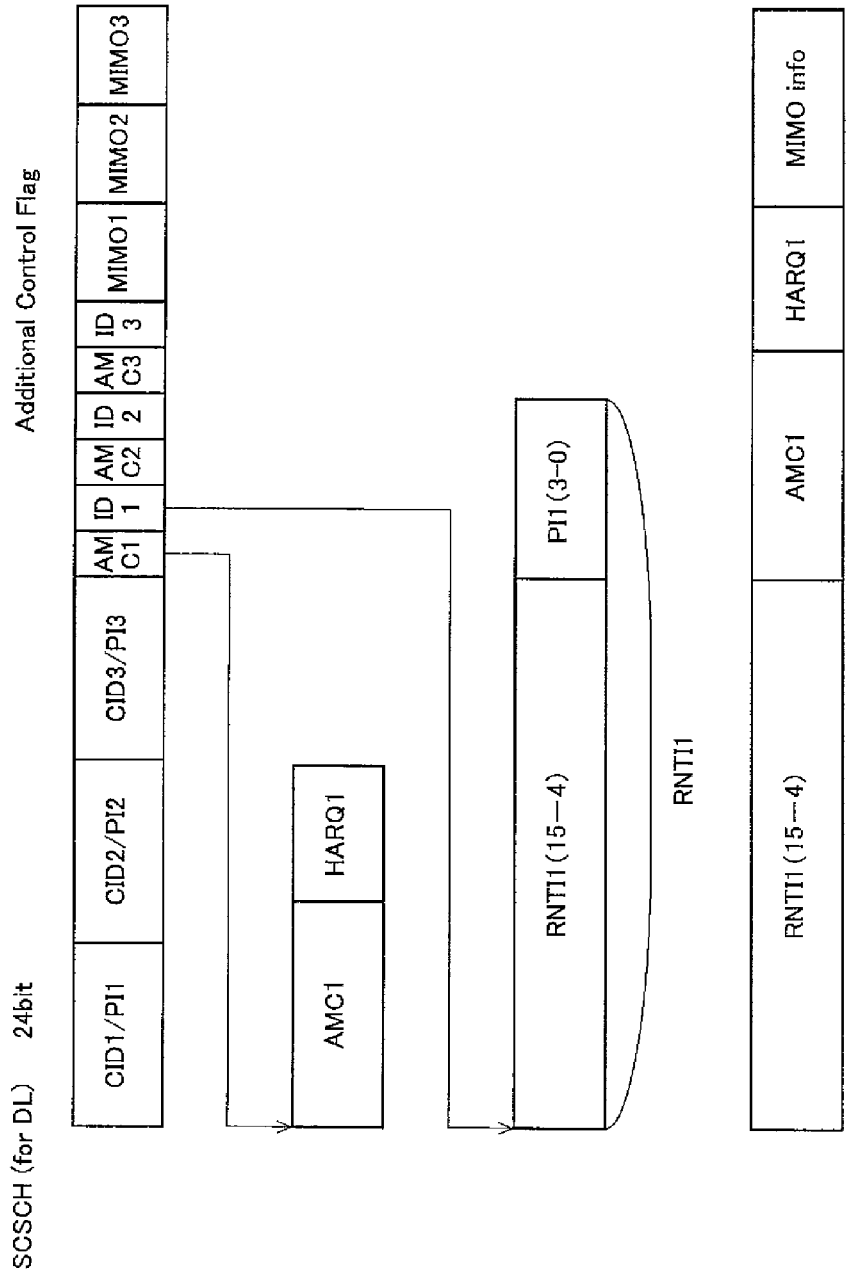
FIG. 13 is a view for explaining an example of a downlink control information system of the SCSCH applied to the present invention.

FIG. 13 is a view for explaining an example of a downlink control information system of the SCSCH applied to the present invention. The SCSCH includes control information for three RBs. The information for one RB is CID/PI (four bits), an AMC flag (one bit), an ID flag (one bit), and a MIMO flag (two bits).

The AMC flag, the ID flag, and the MIMO flag are Additional Control Flags indicating a configuration of the Additional CSCH.

The CID/PI is used as the above CID in some cases and is also disposed in a portion (such as low-order four bits) of the mobile station identifier (such as RNTI and IMSI) as a Paging Indicator for mobile stations not having the CID allocated. If the mobile station identifier is used to perform the simultaneous calling in the idle mode or the discontinuous reception mode, the Paging Indicator may be encoded with a scrambling code different from the normal SCSCH. Although the scrambling code is normally allocated as a code specific to a cell, multiplication of a common scrambling code for the Paging Indicator may be performed by the base station in the case of the simultaneous notification such as the Paging Indicator since the same information is transmitted in a plurality of cells.

The ID flag is used to discriminate the above two types of cases. If the ID flag is one, this indicates that the RNTI is disposed in the Additional-CSCH area. Since the RNTI disposed in the Additional-CSCH includes a four-bit portion already indicated as the PI, only remaining 12 bits are enough.

The AMC flag is used only when a modulation mode/encoding rate is changed. If the AMC flag is one, a changed modulation mode/encoding rate (five bits) is indicated by the Additional-CSCH. Currently considered modulation mode/encoding rate candidates are QPSK1/8, QPSK1/4, QPSK1/2, QPSK2/3, 16QAM1/2, 16QAM2/3, 64QAM1/2, 64QAM3/5, 64QAM2/3, and 64QAM3/4.

The MIMO flag is a flag indicating which mode is used to transmit the RB among non-MIMO, two-antenna MIMO, and four-antenna MIMO. Information necessary for controlling the MIMO is transmitted through the Additional-CSCH.

Feedback information from the base station of the HARQ is included in the Additional-CSCH or the SDCH.

Figure 14:
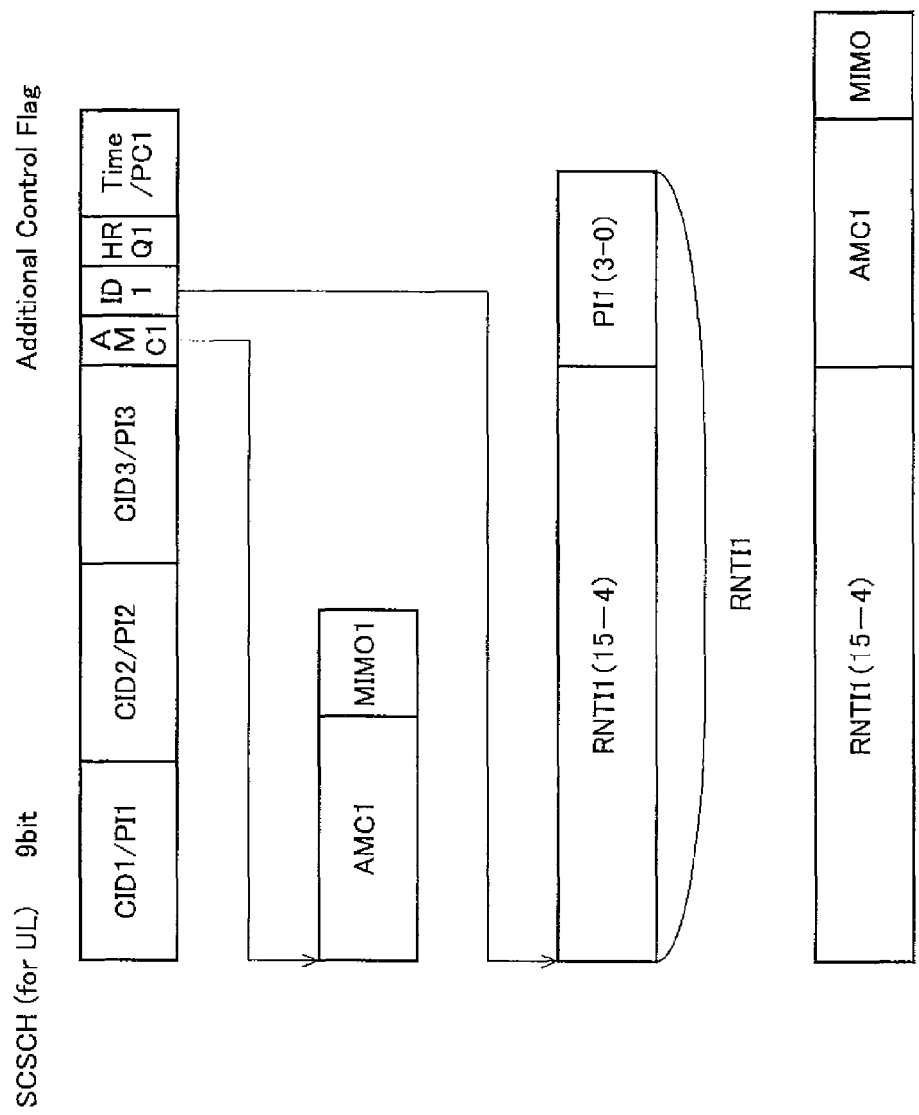
FIG. 14 is a view for explaining an example of an uplink control information system of the SCSCH applied to the present invention.

FIG. 14 is a view for explaining an example of an uplink control information system of the SCSCH applied to the present invention. This uplink control information includes control information related to scheduling of the uplink after several TTIs from the transmission of the SCSCH. Since the uplink user data are transmitted in every 1.125-MHz bands, the control information included in the SCSCH corresponds to one RB. The information for uplink RB is CID/PI (four bits), an AMC flag (one bit), an ID flag (one bit), an HRQ flag (one bit), and a Time/PowerC (Time/PC) flag.

The AMC flag and the ID flag are Additional Control Flags indicating a configuration of the Additional CSCH.

The CID/PI is used as the above CID in some cases and is also disposed in a portion (such as low-order four bits) of the mobile station identifier (such as RNTI and IMSI) as a Paging Indicator for mobile stations not having the CID allocated.

The ID flag is used to discriminate the above two types of cases. If the ID flag is one, this indicates that the RNTI is disposed in the Additional-CSCH area. Since the RNTI disposed in the Additional-CSCH includes a four-bit portion already indicated as the PI, only remaining 12 bits are enough. Since the ID flag is utilized, the IDs disposed in the CID/PI form a hierarchical configuration and the mobile station identifier can efficiently be converted.

The HARQ flag is feedback information from the base station to the uplink user data. The Time/PowerC flag is a flag for adjusting synchronization and electric power of the uplink signal transmission.

The AMC flag is used only when a modulation mode/encoding rate/MIMO mode is changed. If the AMC flag is one, a changed modulation mode/encoding rate (five bits) is indicated by the Additional-CSCH. Currently considered modulation mode/encoding rate candidates are QPSK, 8PSK, and 16QAM. Information necessary for controlling the uplink MIMO is indicated by the Additional-CSCH.

Figure 15:
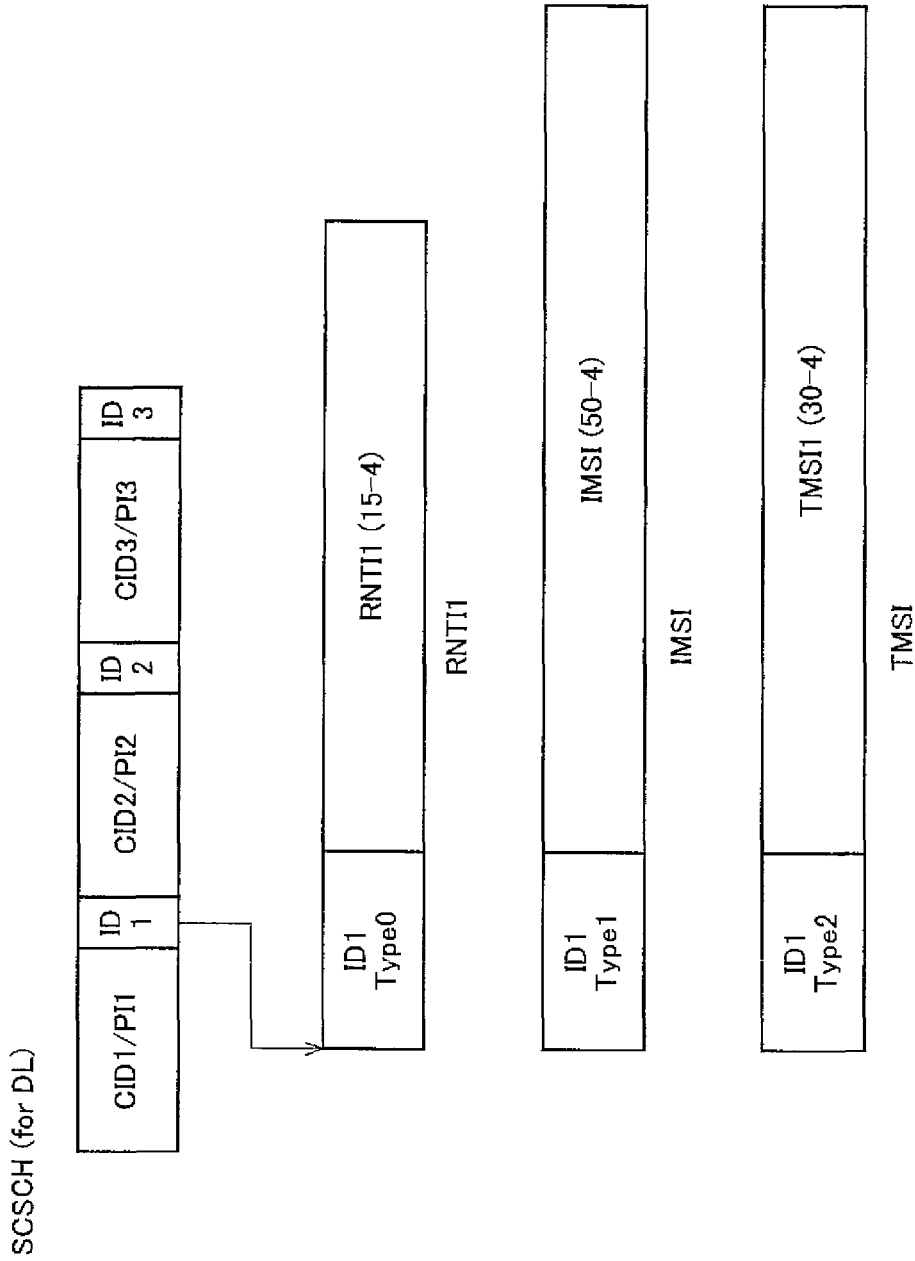
FIG. 15 is a view of an example of details of ID disposed in an Additional-CSCH area.

FIG. 15 is a view of an example of details of ID disposed in the Additional-CSCH area. The IDs used in the mobile communication system include IDs with various number of bits and tracking areas, such as RNTI and IMSI that is a global ID as described above. A flag indicating ID types is prepared for discriminating these IDs. For example, Type0, Type1, and Type 2 indicate RNTI, IMSI, and TMSI, respectively. Actual ID information is disposed after this flag. Therefore, a variable-length ID disposition area can be achieved.

FIG. 16 is a view of an exemplary Chunk configuration if three users share RB through one Chunk. The SCSCH of the Chunk shares and uses the DPCH and one OFDM symbol, and the Additional Control Flag is assigned only for a user 1. A user 2 and a user 3 use the Additional-CSCH area as the SDCH.

Figure 17:
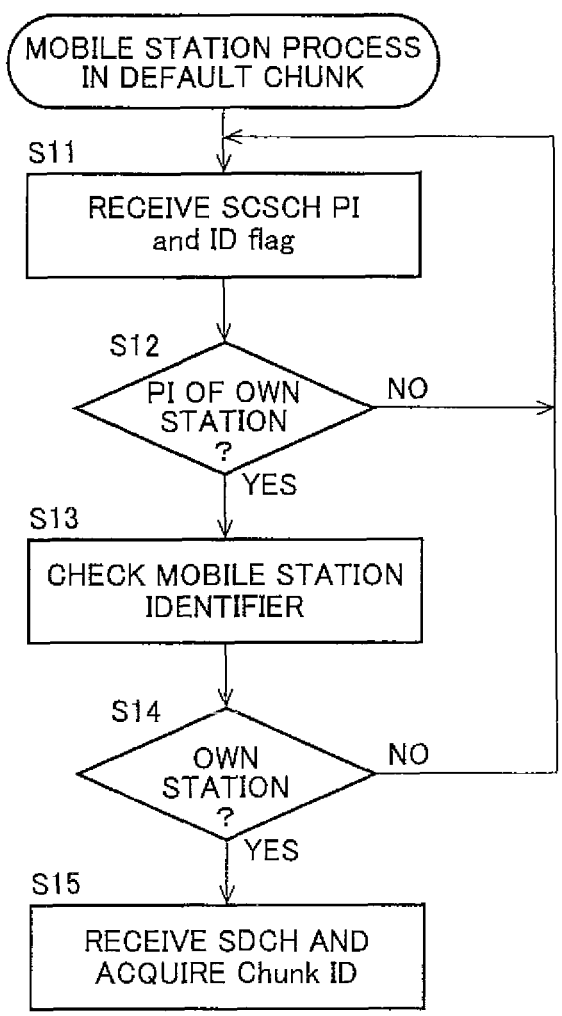
FIG. 17 is a view for explaining an example of a process procedure when a mobile station acquires CID with a Chunk having no CID acquired.

FIG. 17 is a view for explaining an example of a process procedure when a mobile station acquires the CID with a Chunk having no CID acquired. The same process is executed for this process in the uplink and the downlink.

The mobile station receives the CID/PI and the ID flag of the SCSCH of the Chunk (S11); a portion of the mobile station identifier of the own station is indicated by the CID/PI; and it is determined whether the ID flag is one (S12). If it is determined in the above determination that data for the own station are not included, the reception process is shifted to the SCSCH of another Chunk in the Chunk Table. A process in this Chunk is shifted to a reception process of the SCSCH of the next frame.

If it is determined in the above determination that data for the own station are included (S12), the mobile station identifier of the Additional-CSCH area is received (S13). If the mobile station identifier is not identical to that of the own station (S14), the reception process is shifted to the SCSCH of next frame. If the mobile station identifier is identical to that of the own station (S14), the SDCH is received to acquire the CID (S15). The CID is transmitted from the base station to the Additional-CSCH area and the mobile station may receive the Additional-CSCH to receive the CID.

With regard to the acquisition of the CID, instead of acquiring one-by-one from each Chunk, the SDCH may be transmitted from the base station with the inclusion of information of the Chunk Table including the CID of another Chunk. Alternatively, a pattern of the Chunk Table may preliminarily be specified such that both the base station and the mobile station can retain the Chunk Table of a predefined pattern without exchanging information of the Chunk Table between the base station and the mobile station. This enables an efficient CID acquisition process.

An available time is set for the CID information of the Chunk Table such that the CID is automatically erased in a Chunk not used for a certain time period. The available time is calculated by both the base station and the mobile station and if the SDCH is not transmitted/received after the available time has expired, the CIDs of the respective Chunk Tables are set to Null.

Figure 18:
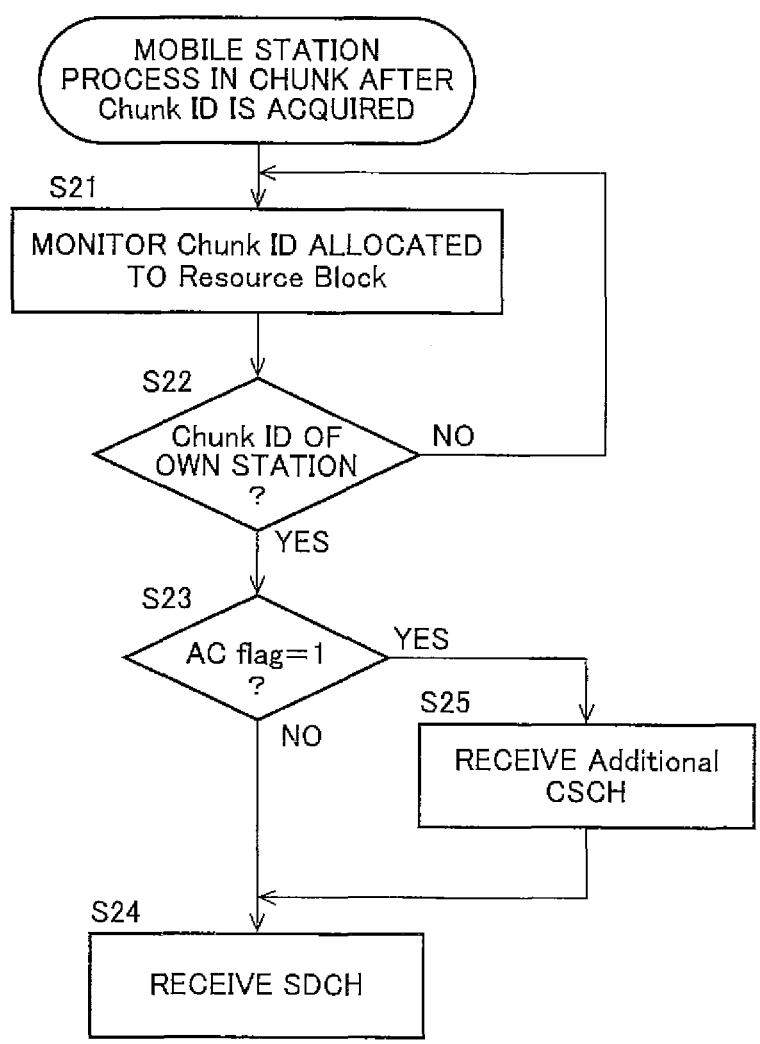
FIG. 18 is a view for explaining an example of a process procedure when a mobile station receives user data with a Chunk having CID already acquired.

FIG. 18 is a view for explaining an example of a process procedure when the mobile station receives user data with a Chunk having the CID already acquired. The CID allocated to the RB is monitored (S21), and if the CID of the own station is assigned and the ID flag is zero (S22), an ACF (Additional Control Flag) is received. If the AC flag is one (S23), the Additional-CSCH is received (S25), and after additional control information is received, the SDCH is received (S24). If the AC flag is zero (S23), the SDCH is received (S24).

Figure 19:
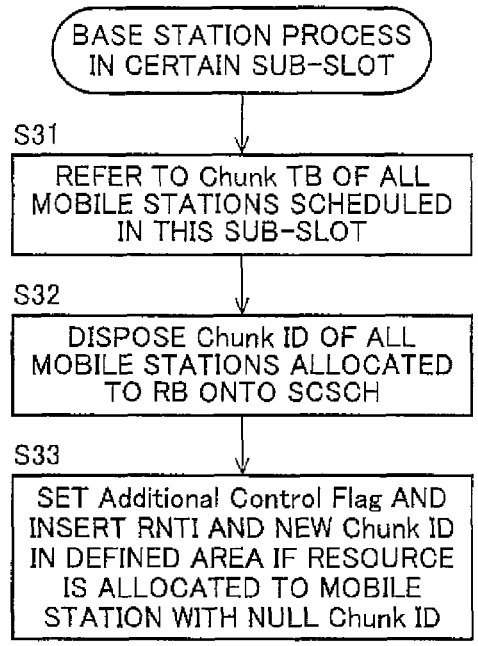
FIG. 19 is a view for explaining an example of a process procedure of a base station that performs scheduling in a sub-slot.

FIG. 19 is a view for explaining an example of a process procedure of a base station that performs scheduling in a sub-slot. Mobile stations likely to be scheduled in the sub-slot are determined from Chunk Tables of the mobile stations and buffer amounts of data transmitted to the mobile stations, and a reference is made to the Chunk Tables and the Chunk IDs of all the mobile stations likely to be scheduled in the sub-slot (S31).

The mobile stations allocated to the RBs are scheduled with consideration given to radio environments of the respective mobile stations, and the Chunk IDs of the mobile stations are disposed in the SCSCH (S32). If a resource is allocated to a mobile station with the Chunk ID set to Null, the Additional Control Flag is set, and the RNTI and a new Chunk ID or new Chunk Table information are inserted into a defined area (the Additional-CSCH area or SDCH area) (S33).

Figure 20:
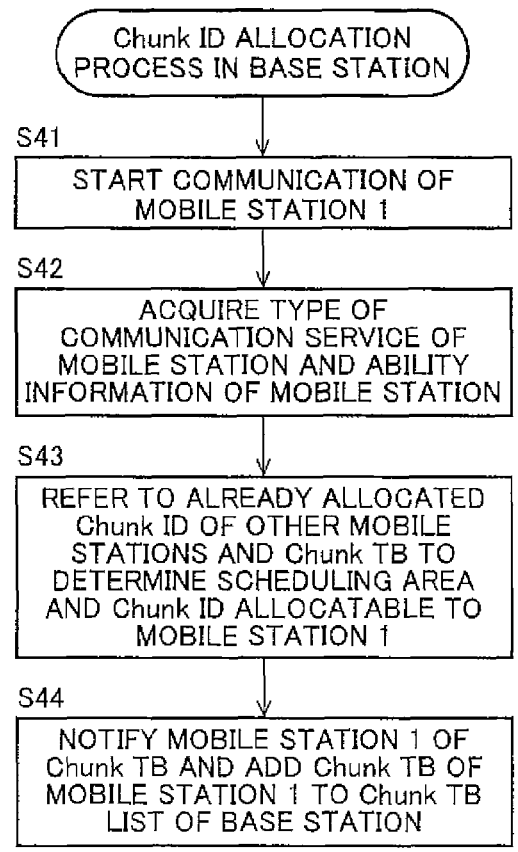
FIG. 20 is a view for explaining an example of a Chunk ID allocation process procedure in a base station.

FIG. 20 is a view for explaining an example of a Chunk ID allocation process procedure in a base station. When the base station detects the start of communication of the mobile station 1 in accordance with reception of a packet or a communication service activation request from the mobile station (S41), the base station acquires a communication service type of the mobile station and information of ability of the mobile station (S42).

The base station also refers to the already allocated Chunk IDs of other mobile stations and the Chunk Table to determine a scheduling area and a Chunk ID allocatable to the mobile station 1 (S43). When a scheduling area is allocatable, if the scheduling area cannot be allocated to the mobile station 1 since the Chunk ID is allocated to another mobile station, Null is set. The mobile station 1 is notified of the Chunk Table, and the Chunk Table of the mobile station 1 is added to a Chunk Table list retained in the base station (S44).

Figure 21:
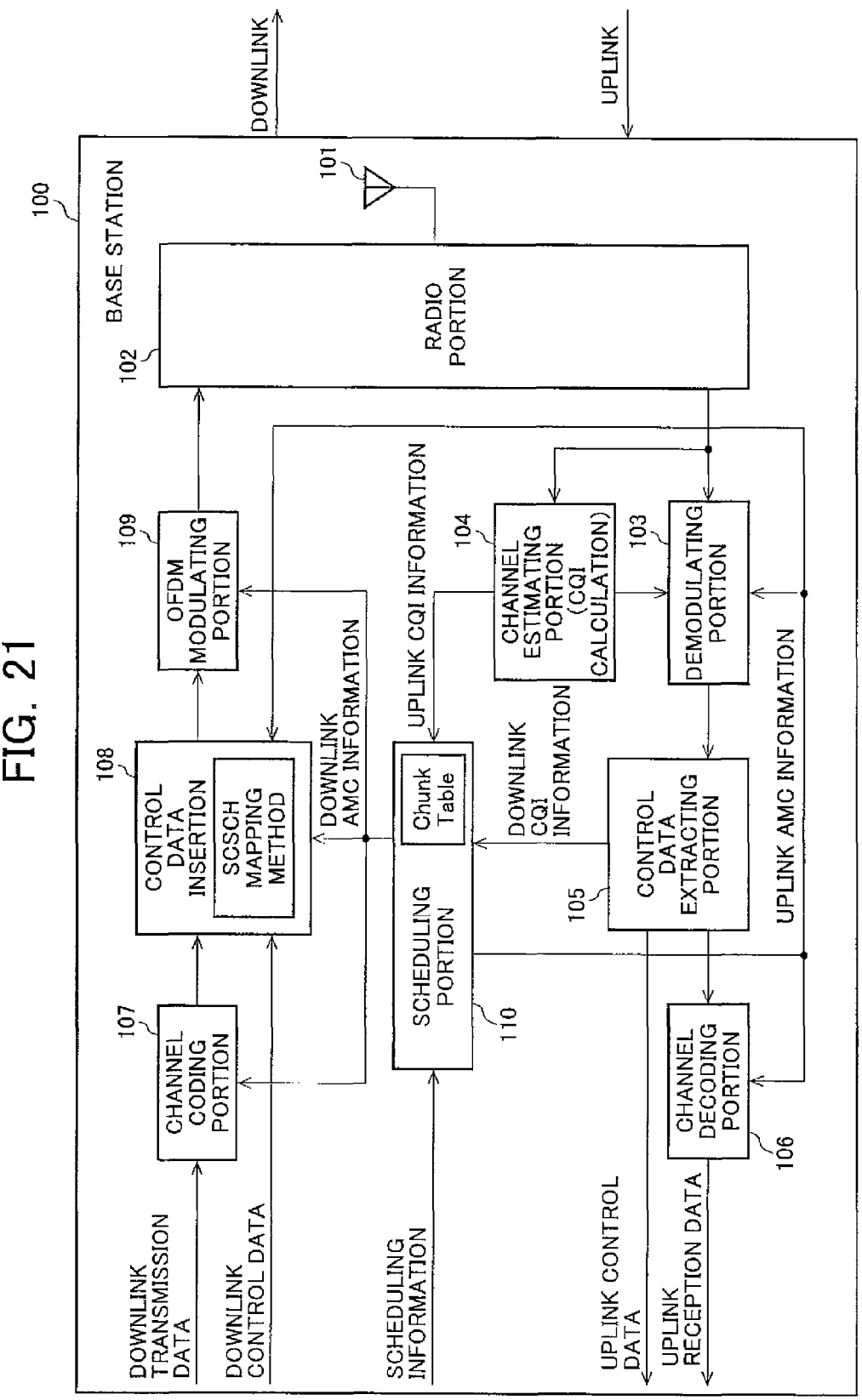
FIG. 21 is a view for explaining a principle of operation of the base station assumed based on the proposition of 3GPP.

FIG. 21 is a view for explaining a principle of operation of the base station assumed based on the proposition of 3GPP.

In a base station 100, if the base station 100 receives packet data (including the mobile station identifier, for example, IMSI (International Mobile Subscriber Identity), IMEI (International Mobile Equipment Identity), TMSI (Temporary Mobile Subscriber Identity), TMEI (Temporary Mobile Equipment Identity), RNTI (Radio Network Temporary Identity), and IP address) addressed to a mobile station 200 from a higher-level network node (e.g., SGSN (Serving GPRS Support Node) or RNC (Radio Network Control) of the W-CDMA mode, not shown), the packet data are stored in a base-station transmission data buffer (not shown).

The downlink transmission data from the transmission data buffer are input to a channel coding portion 107; the channel coding portion 107 inputs output signals from a scheduling portion 110, i.e., downlink AMC information such as a downlink AMC mode and downlink mobile station allocation information (downlink scheduling information) and uses the AMC mode defined by the downlink AMC information (e.g., turbo code, encoding rate 2/3) to execute the encoding process for the downlink transmission data; and the output thereof is input to a control data inserting portion 108. The scheduling of the mobile stations 200 are performed with reference to the Chunk Table and the Chunk Table is updated after the scheduling.

The downlink control data include control data for the downlink pilot channel DPCH, the downlink common control channel CCCH, and the downlink synchronization channel SNCH. The downlink control data are input to the control data inserting portion 108 and the control data mapping is performed for the downlink common control channel CCCH.

On the other hand, the downlink AMC information (such as AMC mode and downlink scheduling information) determined by the scheduling portion 110 is input to the control data inserting portion 108 and the control data mapping is performed for the downlink shared control signaling channel SCSCH.

The output of the control data inserting portion 108 is sent to an OFDM modulating portion 109 along with the downlink common control channel CCCH, the downlink shared control signaling channel SCSCH, and the downlink shared data channel SDCH mapped thereon. The OFDM modulating portion 109 performs the data modulation, the serial/parallel conversion of the input signal, and the multiplication of the spread code and the scrambling code and executes an OFDM signal process such as IFFT (Inverse Discrete Fourier Transform), CP (Cyclic Prefix) insertion, and filtering to generate an OFDM signal. The OFDM modulating portion 109 inputs the downlink AMC information from the scheduling portion to control the data modulation (e.g., 16QAM) of the sub-carriers. The radio frame shown in FIG. 1 is generated and converted to the RF (Radio Frequency) frequency band by a transmission circuit of a radio portion, and the downlink signal is transmitted from the antenna portion 101.

On the other hand, the uplink signal sent from the mobile station 200 is received by the antenna portion 101, converted from the RF frequency to IF or directly to the base band by a reception circuit of the radio portion 102, and input to a demodulating portion 103. The uplink signal may be an OFDM signal, an MC-CDMA (Multi-Carrier-CDMA) signal, or a single carrier SC signal and a VSCRF-CDMA (Variable Spreading and Chip Repetition Factors-CDMA) signal for reducing PAPR (see, e.g., patent document 2).

An uplink channel estimating portion 104 uses the uplink pilot channel UPCH to estimate the propagation path quality of the individual uplink channels of the mobile stations 200 and calculates the uplink propagation path quality information CQI. The calculated uplink CQI information is input to the scheduling portion 110. In this case, the scheduling of the mobile stations 200 is performed referring to the Chunk Table, and the Chunk Table is updated after the scheduling. The uplink AMC information such as uplink AMC mode and uplink scheduling information is input to the control data inserting portion 108, mapped on the downlink shared control signaling channel SCSCH, and transmitted to the corresponding mobile station 200.

The corresponding mobile station 200 transmits packet data with the determined uplink AMC mode and uplink scheduling information in accordance with the uplink AMC information that is output from the scheduling portion 110. The uplink signal of the packet data is input to the demodulating portion 103 and a channel decoding portion 106. On the other hand, the uplink AMC information output from the scheduling portion 110 is input to the demodulating portion 103 and the channel decoding portion 106, and the demodulation (e.g., QPSK) and decoding process (e.g., convolution coding, encoding rate 2/3) is executed for the uplink signal in accordance with this information.

A control data extracting portion 105 extracts control information of an uplink contention-based channel UCBCH and an uplink shared control signaling channel USCSCH. The control data extracting portion 105 extracts the downlink propagation path quality information CQI of the mobile station 200 sent through the uplink shared control signaling channel USCSCH and inputs the information to the scheduling portion 110 to generate the downlink AMC information.

The scheduling portion 110 receives input of the uplink CQI information from the uplink channel estimating portion 104, input of the downlink CQI information fed back by the mobile station 200 from the control data extracting portion 105, and input of the downlink/uplink transmission data buffer information, the uplink/downlink QoS (Quality of Service) information, various pieces of service class information, the mobile station class information, and the mobile station identifier of the mobile stations from a base station control portion (not shown).

The scheduling portion 110 integrates these pieces of input information and the Chunk Table, generates, in the assigned or calculated center frequency, the uplink/downlink AMC information in accordance with the selected scheduling algorithm, and outputs the information to the portions shown in FIG. 13 to implement the transmission scheduling of the packet data.

Figure 22:
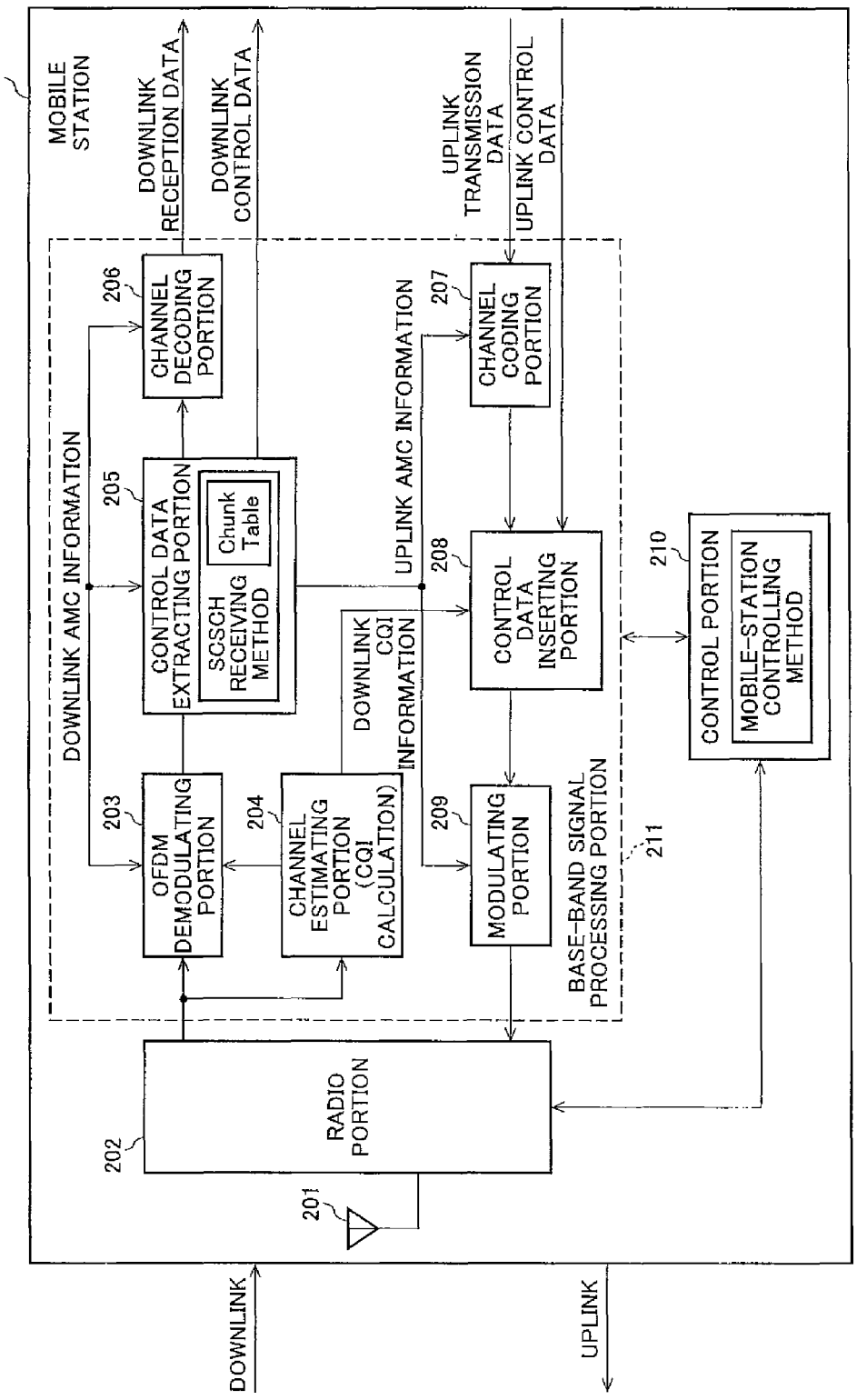
FIG. 22 is a view for explaining a principle of operation of the mobile station assumed based on the proposition of 3GPP.

FIG. 22 is a view for explaining a principle of operation of the mobile station assumed based on the proposition of 3GPP.

The mobile station 200 receives the downlink OFDM signal with an antenna portion 201, converts the downlink reception signal from the RF frequency to IF or directly to the base band with a local RF frequency oscillation circuit (synthesizer), a down converter, a filter, an amplifier, etc., of a radio portion, and inputs the signal to an OFDM demodulating portion 203. A downlink channel estimating portion 204 uses the downlink pilot channel DPCH (uses the downlink common pilot channel DCPCH, the downlink dedicated pilot channel DDPCH, or a combination of both) to estimate the propagation path quality of the individual downlink channels of the mobile stations 200 and calculates the downlink propagation path quality information CQI. The calculated downlink CQI information is input to a control data inserting portion 208, mapped on the uplink shared control signaling channel USCSCH, and transmitted to the base station 100.

An OFDM demodulating portion 203 performs removal of CP (Cyclic Prefix) of the input signal, FFT (Discrete Fourier Transform), and the multiplication of the spread code and the scrambling code, executes the OFDM signal demodulation process such as the parallel/serial conversion, data demodulation, and filtering to generate the demodulation data, which are input to a control data extracting portion 205.

The control data extracting portion 205 extracts the downlink channel control information (such as downlink access information and broadcast information) other than the downlink shared data channel SDCH. The downlink AMC information is extracted such as the downlink AMC mode and the downlink scheduling information mapped on the downlink shared control signaling channel SCSCH and is output to the OFDM demodulating portion 203 and a channel decoding portion 206. The uplink AMC information is extracted such as the uplink AMC mode and the uplink scheduling information mapped on the downlink shared control signaling channel SCSCH and is output to a modulating portion 209 and a channel coding portion 207. Whether this SCSCH includes information addressed to the own station is determined with the use of the CID/PI of the SCSCH and the Chunk Table.

The OFDM demodulating portion 203 uses the AMC mode (e.g., 16QAM) defined by the downlink AMC information to demodulate the sub-carriers. The channel decoding portion 206 uses the AMC mode (e.g., turbo code, encoding rate 2/3) defined by the downlink AMC information to decode the packet data addressed to the own station, which are mapped on the downlink shared data channel SDCH.

The channel coding portion 207 inputs the uplink transmission data that are individual packet data of the mobile station 200, uses the downlink AMC information (e.g., convolution coding, encoding rate 2/3) output from the control data extracting portion 205 to encode the data, which are output to the control data inserting portion 208.

The control data inserting portion 208 maps the downlink CQI information from the downlink channel estimating portion 209 onto the uplink shared control signaling channel USCSCH included in the uplink scheduling channel USCH and maps the uplink contention-based channel UCBCH and the uplink scheduling channel USCH onto the uplink transmission signal.

The modulating portion 209 uses the downlink AMC information (e.g., QPSK) output from the control data extracting portion 205 to perform data modulation and outputs the signal to a transmission circuit of the radio portion 202. The uplink signal may be modulated with the use of the OFDM signal, the MC-CDMA signal, or the single carrier SC signal and the VSCRF-CDMA signal for reducing PAPR.

A control portion 210 has the mobile station class information, the unique frequency bandwidth information, and the mobile station identifier. The control portion 210 sends a control signal causing a shift to the assigned or calculated center frequency to the radio portion 202 and performs the shift to the center frequency with the local RF frequency oscillation circuit (synthesizer) of the radio portion 202.

A base band signal is converted to the RF frequency band by the local RF frequency oscillation circuit (synthesizer), an upconverter, a filter, and an amplifier of the radio portion 202 and the uplink signal is transmitted from the antenna portion 201. The radio portion 202 includes IF and RF filters corresponding to different frequency bandwidths (e.g., 1.25 MHz, 2.5 MHz, 5 MHz, 10 MHz, 20 MHz).

Although it has been assumed in the above description that the scheduling information of the resource allocation is not included in the SCSCH and that the RB is allocated in accordance with the disposed positions of the Chunk IDs, the case of including the scheduling information in the SCSCH will hereinafter be described. By adding the scheduling information to the SCSCH, disposition of the mobile station identifier and the allocation of the RB can separately be considered.

Figure 23:
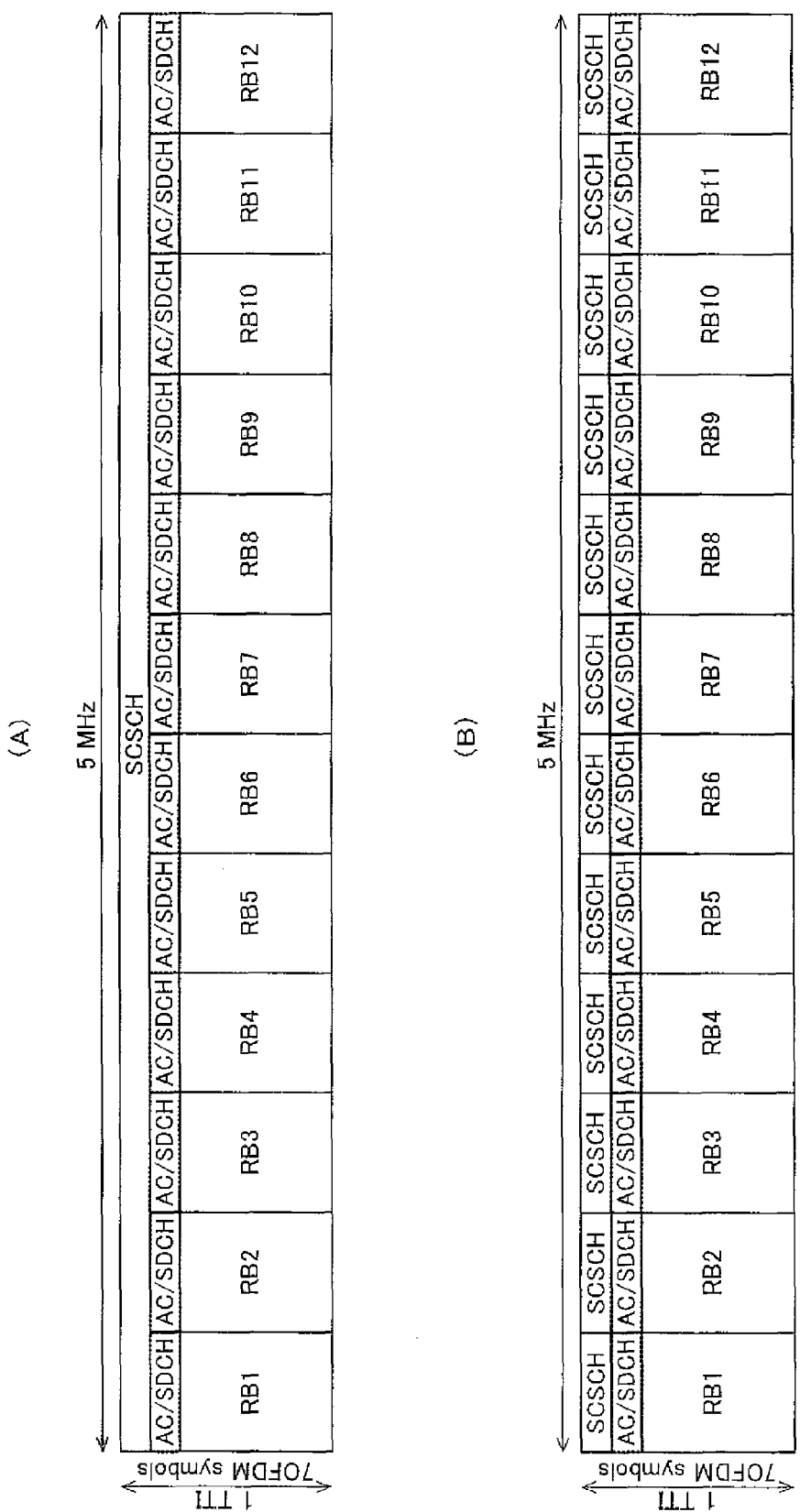
FIG. 23 is a view of a physical mapping example of RB and SCSCH in a 5-MHz band.

FIG. 23 shows physical mapping of the RB and the SCSCH in the 5-MHz band. In FIG. 23(A), the SCSCH is disposed in the 5-MHz band and has a configuration different from the RB as in FIG. 3(A) described above. On the other hand, in FIG. 23(B), the SCSCH is divided into the same bandwidths as the RB as in FIG. 3(B). However, the SCSCH does not have to be the control information of the RB located at the same frequency band position. The SCSCH can be handled as the control information of the RB located at a frequency band position different from that of the SCSCH by reference to the scheduling information in the SCSCH.

Figure 26:
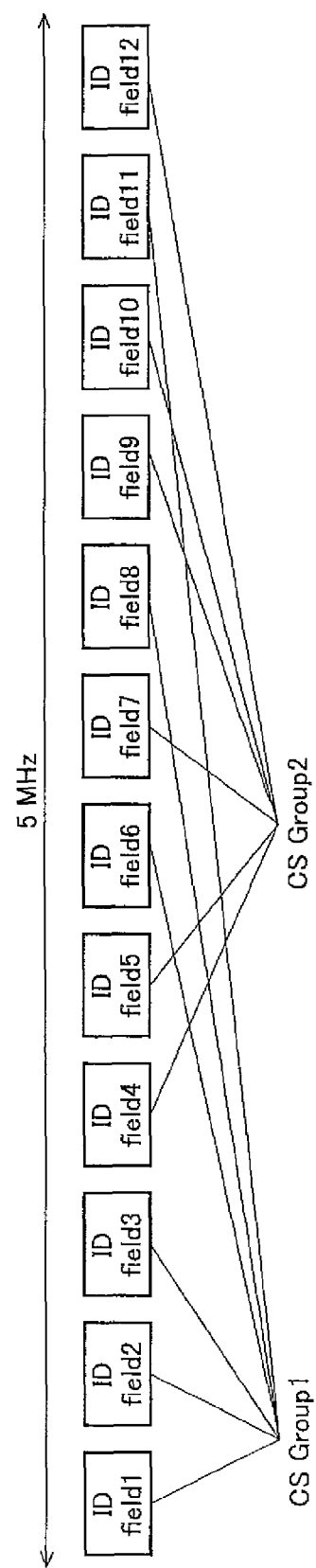
FIG. 26 is a view of an example of grouping of mobile station identifier fields (ID-Fields) in SCSCH.

FIG. 26 shows an example of grouping of the mobile station identifier field (ID-Field) in the SCSCH. In both the case of FIG. 23(A) and the case of F*ig.* 23(B), logical or physical positions of the mobile station identifier are grouped to define respective mobile station identifier groups (CS groups) in the SCSCH. In this case, ID-Fields 1, 2, 3, 6, 8, and 11 are grouped as a CS Group 1, and ID-Fields 4, 5, 7, 9, 10, and 12 are grouped as a CS Group 2.

Unique mobile station identifier CSID (Control Signaling UE ID) is introduced within the ID-Field groups. Although this means that the mobile stations are identified within the ID-Field groups since the disposition of the mobile station identifier and the allocation of the RB are separately considered, the concept is the same as the Chunk IDs.

Specifically, the number of users capable of using the ID-Fields of the CS-Group 1 is limited to, for example, 16, and the identifier used in the CS-Group 1 is represented by four bits. The CS Group configuration and the CSID are transmitted from a base station to a mobile station at the start of communication or along with data of the communication as a CS Group Table in the same way as the Chunk Table. The mobile station refers to the CS Group Table allocated to the own station to detect whether the own CSID is included in the ID-fields of the SCSCH. That is, the processes of the mobile station and the base station are the same as those in the controlling method using the Chunk Table and the CID.

Figure 24:
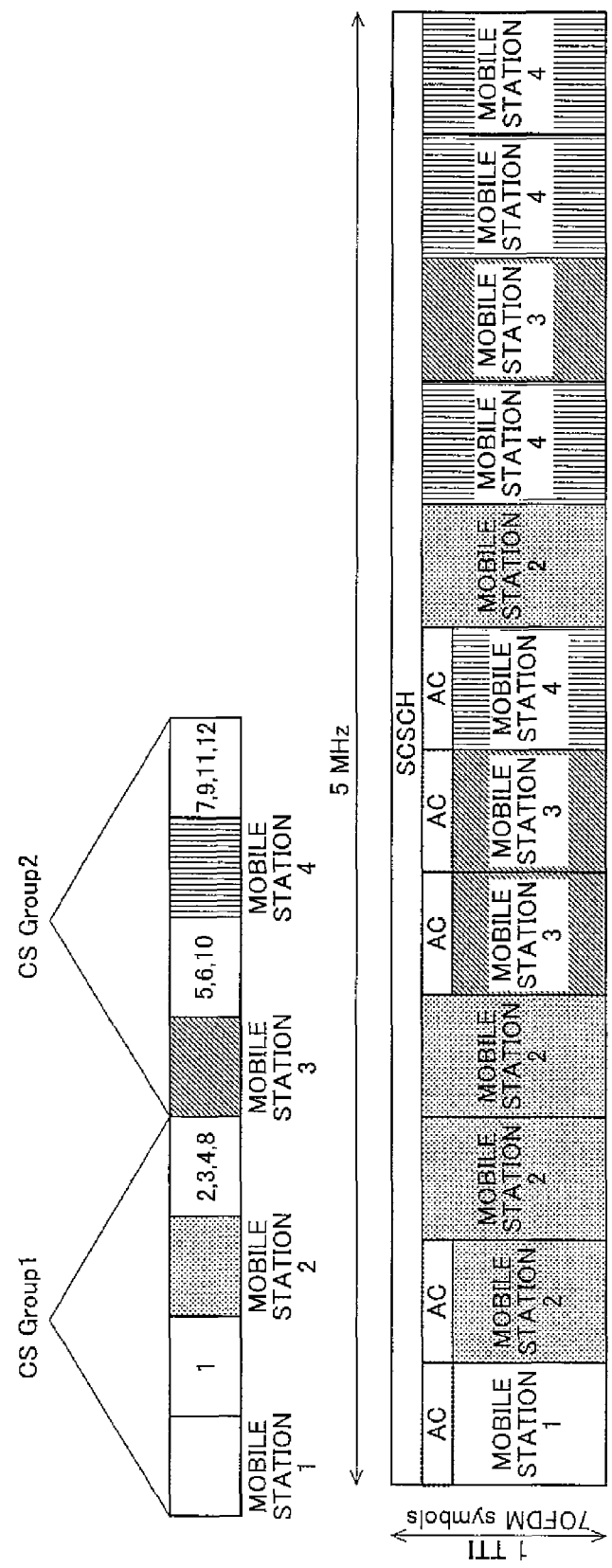
FIG. 24 is a view of an example of a configuration of ID-Fields and resource allocation information in SCSCH and an actual resource allocation method in the configuration of FIG. 23(A).

FIG. 24 is a view of an example of a configuration of ID-Fields and resource allocation information in the SCSCH and an actual resource allocation method in the configuration of FIG. 23(A). To the ID-Fields of the CS Group 1, the mobile station 1 and the mobile station 2 are allocated. This is assigned by the CSIDs that are identifier unique only in the CS Group 1. The resource allocation information is added in association with the respective CSIDs. It is shown that an RB 1 is allocated to the mobile station 1, and that an RB 2, an RB 3, an RB 4, and an RB 8 are allocated to the mobile station 2. The CS Groups are distinguished by logical disposed positions in the SCSCH. The Additional-CSCF is disposed in the RB only when needed.

Figure 25:
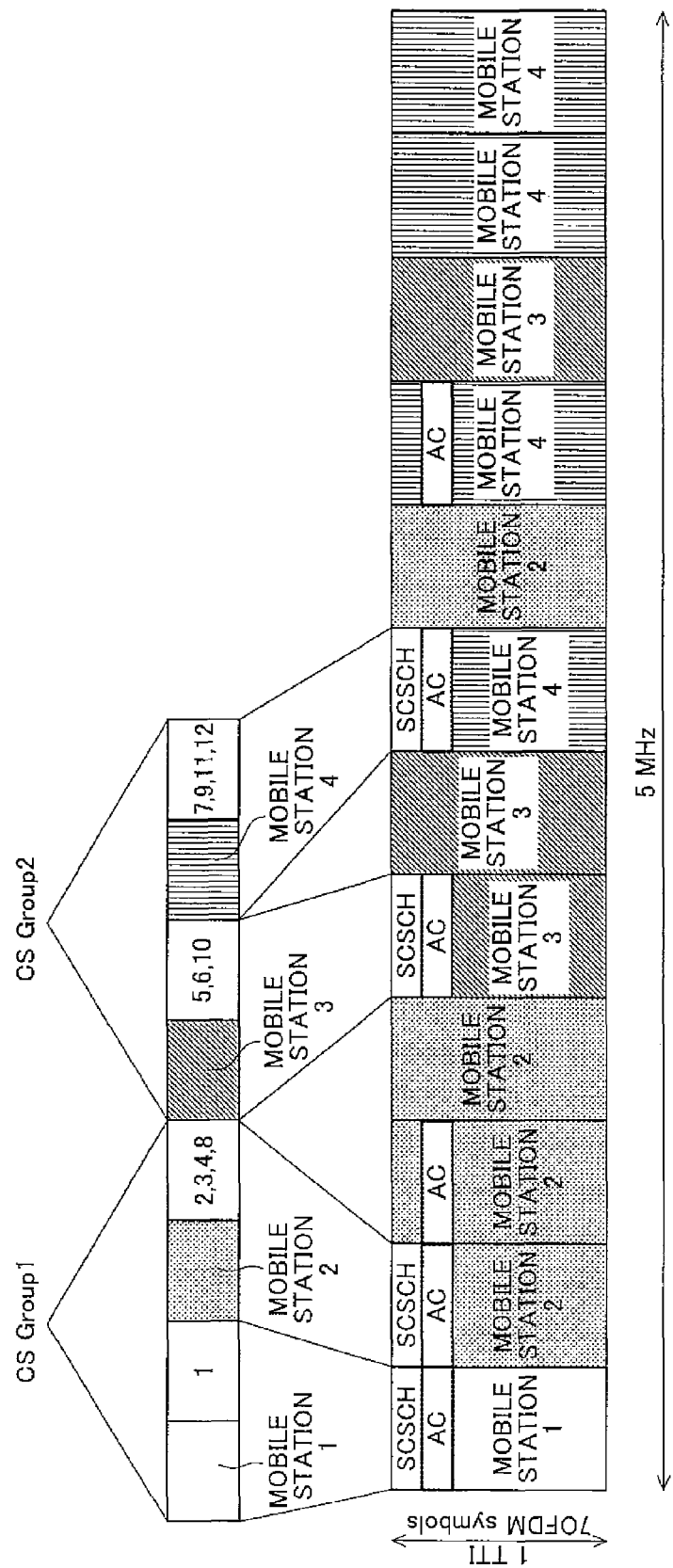
FIG. 25 is a view of an example of a configuration of ID-Fields and resource allocation information in SCSCH and an actual resource allocation method in the configuration of FIG. 23(B).

FIG. 25 is a view of an example of a configuration of the ID-Fields and resource allocation information in the SCSCH and an actual resource allocation method in the configuration of FIG. 23(B). To the ID-Fields of the CS Group 1, the mobile station 1 and the mobile station 2 are allocated. This is assigned by the CSIDs that are identifier unique only in the CS Group 1. The resource allocation information is added in association with the respective CSIDs.

It is shown that the RB 1 is allocated to the mobile station 1, and the RB 2, the RB 3, the RB 4, and the RB 8 are allocated to the mobile station 2. Unlike FIG. 24, the SCSCHs in the respective CS Groups are disposed at physically separated positions. As shown in FIG. 25, the SCSCHs may only be disposed at the upper parts of the RB 1, the RB 2, an RB 5, and an RB 7, or the number of the SCSCHs may be changed as needed. If four SCSCHs are located within 5 MHz, the number of simultaneously allocatable mobile stations is limited to four.

On the other hand, for example, if the SCSCHs are disposed at the upper parts of all the RBs, the number of simultaneously allocatable mobile stations is 12. The SCSCH configuration information such as the number of simultaneously allocatable mobile stations is supplied from the base station to the mobile station along with the CS Group Table. Alternatively, the mobile station decodes the SCSCHs on the basis that the SCSCHs are disposed at the upper parts of all the RBs, and only if the SCSCHs are correctly decoded and the CSIDs are identical, the decode process is executed for the RBs. With this process, the SCSCH configuration can adaptively be changed without supplying the number of allocatable mobile stations from the base station.

That is, the mobile station 4 of FIG. 25 sequentially decodes the ID-Fields (the upper parts of the RB 4, the RB 5, the RB 7, the RB 9, the RB 10, and the RB 12) of the CS Group 2. The ID-Fields of the upper parts of the RB 4 and the RB 5 are not correctly decoded or the CSIDs are not identical.

When the upper part of the RB 7 is decoded, the CSID is identical, and it is detected that the RB 7, the RB 9, the RB 11, and the RB 12 are allocated by reference to the resource allocation information.

As described above, the method of reducing the number of bits of the mobile station identifier can be adapted independently from the physical format and the encoding method of the control signal SCSCH by limiting the unique area of the mobile station identifier.

The CID and the CSID may physically be mapped as a portion of a CRC (Cyclic Redundancy Check) of the SCSCH as is the case with the HS-SCCH of the HSDPA of the W-CDMA mode.

A program operating in the base station device and the mobile station device related to the present invention is a program controlling a CPU, etc., (program driving a computer to implement functions) such that the functions of the embodiment related to the present invention are implemented. The information handled by these apparatuses is temporarily accumulated in a RAM at the time of process, subsequently stored in various ROMs and HDD, and read and modified/rewritten by the CPU as needed.

A recording medium having the program stored thereon may be anyone of a semiconductor medium (e.g., ROM, nonvolatile memory card), an optical recording medium (e.g., DVD, MO, MD, CD, BD), a magnetic recording medium (e.g., magnetic tape, flexible disc), etc.

Although the functions of the above embodiment are implemented by executing the loaded program, the functions of the present invention may also be implemented by executing processes based on instructions of the program in conjunction with an operating system or other application programs.

When distributing in the market, the program can be stored and distributed in a portable recording medium or can be transferred to a server computer connected through a network such as the Internet. In this case, a storage device of the server computer is also included in the recording medium of the present invention.

The invention claimed is:

1. A base station device used in a mobile communication system, comprising:
    a processor configured to assign for a mobile station device one or more groups of physical positions of radio resources each made up of a frequency component corresponding to one or more sub-carriers and a time component corresponding to one or more OFDM symbols to which mobile station identifier fields are mapped within shared control information, where the shared control information is used to assign a resource used at the time of reception from or transmission to the base station device by the mobile station device,
    the base station device allocating to the mobile station device a first mobile station identifier for identifying the mobile station device among one or more mobile station devices having the groups of physical positions of mobile station identifier fields assigned.

2. The base station device as defined in claim 1, wherein a plurality of the groups of physical positions are assigned for the mobile station device.

3. The base station device as defined in claim 2, wherein one or more different combinations of mobile station devices are assigned for each of the plurality of groups of physical positions, and wherein the first mobile station identifier for identifying the mobile station device is allocated for each of the groups of physical-positions.

4. The base station device as defined in claim 3, wherein each of the first mobile station identifier allocated to the mobile station device for each of the groups of physical-positions is the same for the plurality of groups of physical-positions.

5. The base station device as defined in claim 1, wherein the first mobile station identifier is included in shared control information and is transmitted to the mobile station device.

6. The base station device as defined in claim 5, wherein information assigning presence or absence of additional shared control information is included in the shared control information for transmission.

7. The base station device as defined in claim 6, wherein a second mobile station identifier unique to the mobile station device at least within the base station device or a portion thereof is included in the additional shared control information and is transmitted to the mobile station device.

8. The base station device as defined in claim 1, wherein each group of physical positions corresponds to an assigned a resource used at the time of reception from the base station device by the mobile station device.

9. The base station device as defined in claim 1, wherein each group of physical positions corresponds to an assigned a resource used at the time of transmission to the base station device by the mobile station device.

10. A non-transitory computer-readable recording medium having recorded thereon a program which when executed by a computer implements functions of the base station device as defined in claim 1.

11. A mobile station device used in a mobile communication system,
the mobile station device receiving a first mobile station identifier for identifying the mobile station device among one or more mobile station devices having at least one or more assigned groups of physical positions of radio resources each made up of a frequency component corresponding to one or more sub-carriers and a time component corresponding to one or more OFDM symbols to which mobile station identifier fields are mapped—likely to be used by the mobile station device assigned by a base station device among groups of physical positions to which mobile station identifier fields are mapped within shared control information, where the shared control information is used to assign a resource used at the time of reception from or transmission to the base station device by the mobile station device.

12. The mobile station device as defined in claim 11, wherein the mobile station device has one or more of the groups of physical-positions assigned by the base station device and wherein the first mobile station identifier for identifying the mobile station device for each of the groups of physical-positions is allocated for each of the plurality of the groups of physical-positions.

13. The mobile station device as defined in claim 12, wherein the first mobile station identifier allocated for each of the plurality of groups of physical-positions is the same for the plurality of groups of physical positions.

14. The mobile station device as defined in claim 11, wherein presence or absence of additional shared control information is determined by receiving information assigning presence or absence of the additional shared control information included in the shared control information.

15. The mobile station device as defined in claim 14, wherein a resource block group including data to the mobile station device is determined with a second mobile station identifier unique to the mobile station device at least within the base station device or a portion thereof included in the additional shared control information.

16. The mobile station device as defined in claim 11, wherein the mobile station identifier field assigns a resource used at the time of reception from the base station device by the mobile station device.

17. The mobile station device as defined in claim 11, wherein the mobile station identifier field assigns a resource used at the time of transmission to the base station device by the mobile station device.

18. A non-transitory computer-readable recording medium having recorded thereon a program which when executed by a computer implements the functions of the mobile station device as defined in claim 11.

19. A mobile station identifier allocation method used in a mobile communication system, wherein
a base station device assigns for a mobile station device one or more groups of physical-positions of radio resources each made up of a frequency component corresponding to one or more sub-carriers and a time component corresponding to one or more OFDM symbols to which mobile station identifier fields are mapped within shared control information likely to be used by the mobile station device, and wherein
the base station device allocates to the mobile station device a first mobile station identifier for identifying the mobile station device among one or more mobile station devices having the groups of physical positions of mobile station identifier fields assigned.

* * * * *